United States Patent
Mizuuchi et al.

(10) Patent No.: US 8,254,415 B2
(45) Date of Patent: Aug. 28, 2012

(54) SHORT WAVELENGTH LIGHT SOURCE AND OPTICAL DEVICE

(75) Inventors: Kiminori Mizuuchi, Ehime (JP); Kazuhisa Yamamoto, Osaka (JP); Tetsuro Mizushima, Osaka (JP)

(73) Assignee: Panasonic Corporation, Osaka (JP)

( * ) Notice: Subject to any disclaimer, the term of this patent is extended or adjusted under 35 U.S.C. 154(b) by 375 days.

(21) Appl. No.: 12/738,443

(22) PCT Filed: Oct. 14, 2008

(86) PCT No.: PCT/JP2008/002894
§ 371 (c)(1),
(2), (4) Date: Apr. 16, 2010

(87) PCT Pub. No.: WO2009/050876
PCT Pub. Date: Apr. 23, 2009

(65) Prior Publication Data
US 2010/0220294 A1 Sep. 2, 2010

(30) Foreign Application Priority Data

Oct. 18, 2007 (JP) .................................. 2007-271151

(51) Int. Cl.
*H01S 3/30* (2006.01)
(52) U.S. Cl. .................. 372/5; 372/21; 372/22; 372/27; 372/69
(58) Field of Classification Search .......... 372/5, 21–22, 372/27
See application file for complete search history.

(56) References Cited

U.S. PATENT DOCUMENTS

| | | | |
|---|---|---|---|
| 5,099,147 A * | 3/1992 | Gregor et al. ................. | 359/327 |
| 6,169,615 B1 | 1/2001 | Shirai | |
| 6,764,183 B2 | 7/2004 | Okazaki | |
| 6,785,040 B2 * | 8/2004 | Budni ........................... | 359/326 |
| 2001/0022566 A1 | 9/2001 | Okazaki | |
| 2004/0156402 A1 | 8/2004 | Tsuchida et al. | |
| 2007/0121684 A1 | 5/2007 | Yamazaki et al. | |
| 2007/0236771 A1 * | 10/2007 | Zadoyan et al. ............. | 359/257 |

FOREIGN PATENT DOCUMENTS

| | | |
|---|---|---|
| JP | 7-30173 | 1/1995 |
| JP | 11-127135 | 5/1999 |
| JP | 2001-264662 | 9/2001 |
| JP | 2004-214324 | 7/2004 |
| JP | 2007-157764 | 6/2007 |

OTHER PUBLICATIONS

International Search Report issued Nov. 11, 2008 in International (PCT) Application No. PCT/JP2008/002894.

Anping Liu et al., "60-W green output by frequency doubling of a polarized Yb-doped fiber laser", Optics Letters, vol. 30, No. 1, Jan. 1, 2005, pp. 67-69.

* cited by examiner

*Primary Examiner* — Dung Nguyen
(74) *Attorney, Agent, or Firm* — Wenderoth, Lind & Ponack, L.L.P.

(57) ABSTRACT

A GaN-based semiconductor laser (1) emits first laser light of a single polarization and having a first wavelength. An optical resonator (30) includes a solid-state laser medium which is excited by incidence of the laser light and which oscillates second laser light having a second wavelength different from the first wavelength. A polarization switch (6) switches over at least one of polarization directions of the first laser light and the second laser light to thereby change the wavelength of laser light to be emitted from the optical resonator (30) or the intensity ratio between a plurality of laser light to be emitted from the optical resonator (30). With the above arrangement, a plurality of laser light can be used effectively.

21 Claims, 17 Drawing Sheets

SHORT WAVELENGTH LIGHT SOURCE AND OPTICAL DEVICE

TECHNICAL FIELD

The present invention relates to a short wavelength light source using a solid-state laser medium, and an optical device incorporated with the short wavelength light source.

BACKGROUND ART

There has been proposed a laser display device incorporated with a laser light source for emitting laser light of three colors of RGB (red, green, and blue). Since laser light has monochromaticity, and is capable of expressing colors in a wide range, a laser display device incorporated with a laser light source is capable of displaying colorful images. A laser light source for emitting laser light of several watts is necessary to realize a large-screen laser display device by laser light of three colors of RGB. There has been used a gas laser such as a high-output Ar laser or Kr laser, as means for realizing the laser light source. These gas lasers, however, have a very low energy conversion efficiency of about 0.1%. Accordingly, a large-sized device including a cooling device has been required.

As means for solving the above problem, there has been considered a technology of generating short wavelength light by a solid-state laser. It has been possible to generate high-output green light by subjecting light of 1.064 μm which has been generated from a solid-state laser such as an YAG laser to wavelength conversion into a second harmonic by a wavelength conversion element. Further, in recent years, there has been reported generation of high-output green light using a Yb-doped fiber laser. For instance, non-patent literature 1 discloses generation of green light of 60 W by using an LBO as a non-linear optical element.

Further, there has been proposed a method of using green light or blue light which is directly generated from a solid-state laser, as a light source. For instance, patent literature 1 proposes a method, wherein red light and green light are generated by exciting a laser medium doped with a trivalent praseodymium ion (Pr3+) by laser light emitted from a GaN-based semiconductor laser, and the red light and the green light are applied to a laser display.

However, in the aforementioned laser light source, it is difficult to modulate the intensity with high efficiency, which is required in a light source for a laser display device. In particular, in non-patent literature 1 and patent literature 1, there is no consideration and proposal about an arrangement of efficiently using both of pump light and laser light, as a light source for a laser display device.

Non-patent literature 1: Anping Liu, Marc A. Norsen, Roy D. Mead, "60-W green output by frequency doubling of a polarized Yb-doped fiber laser", Optics Letters vol. 30 No. 1, Jan. 1, 2005, p. 67-69

Patent literature 1: JP 2001-264662A

DISCLOSURE OF THE INVENTION

In view of the above, it is an object of the present invention to provide a short wavelength light source and an optical device that enable to effectively use a plurality of laser light.

A short wavelength light source according to an aspect of the invention includes a laser light source which emits first laser light of a single polarization and having a first wavelength; an optical resonator including a solid-state laser medium which is excited by incidence of the first laser light and oscillates second laser light having a second wavelength different from the first wavelength; and a polarization switch which switches over at least one of polarization directions of the first laser light and the second laser light to thereby change the wavelength of laser light to be emitted from the optical resonator or an intensity ratio between a plurality of laser light to be emitted from the optical resonator.

In the above arrangement, the laser light source emits the first laser light of a single polarization and having the first wavelength, and the optical resonator includes the solid-state laser medium which is excited by incidence of the laser light and oscillates the second laser light having the second wavelength different from the first wavelength. Further, the polarization switch switches over at least one of the polarization directions of the first laser light and the second laser light to thereby change the wavelength of laser light to be emitted from the optical resonator or the intensity ratio between a plurality of laser light to be emitted from the optical resonator.

According to the invention, the plurality of laser light to be emitted from the optical resonator can be switched over, and the plurality of laser light can be effectively used. Further, since the plurality of laser light of different wavelengths from each other can be simultaneously emitted from the single light source, the configuration of the optical system can be simplified.

These and other objects, features and advantages of the present invention will become more apparent upon reading the following detailed description along with the accompanying drawings.

BEST MODE FOR CARRYING OUT THE INVENTION

Figure 1:
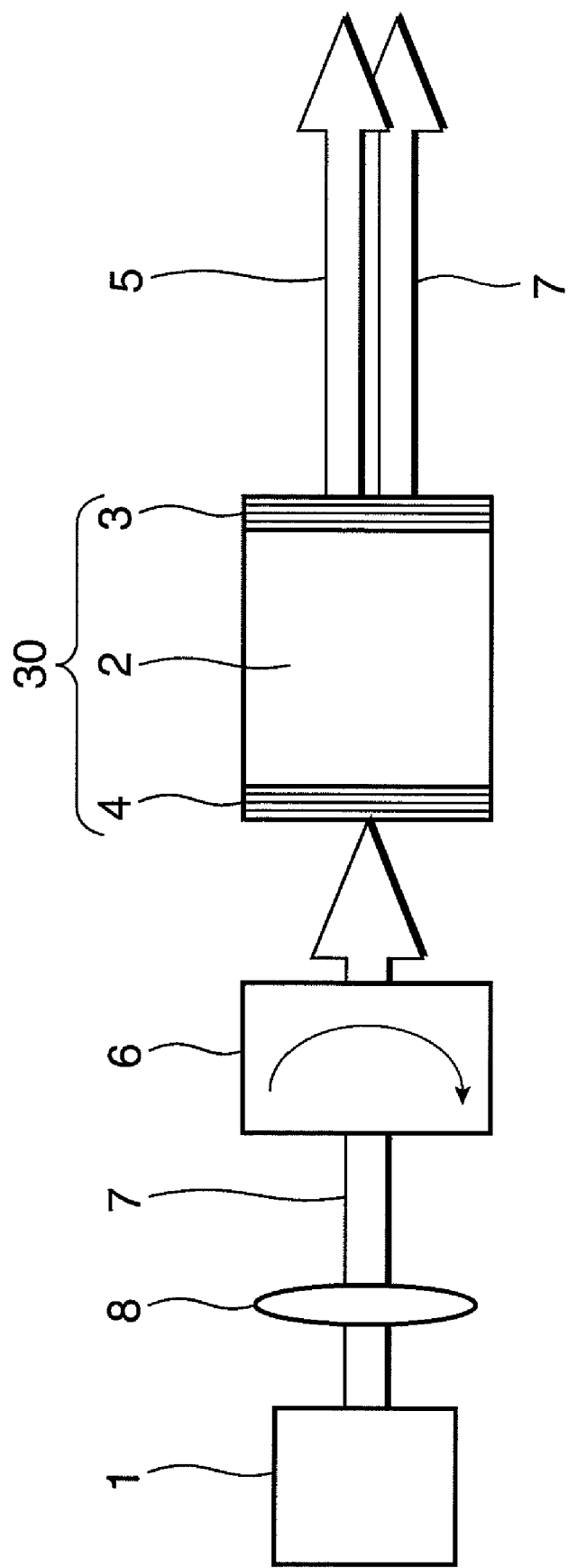
FIG. 1 is a diagram showing an arrangement of a short wavelength light source as a first embodiment of the invention.

In the following, embodiments of the invention are described referring to the drawings. The following embodiments are merely examples embodying the invention, and do not limit the technical scope of the invention.

The respective embodiments to be described in the following are directed to configure a high-efficiency laser light using system, wherein the use efficiency of pump light and laser light is improved in a solid-state laser medium capable of directly emitting short wavelength light.

First Embodiment

FIG. 1 is a diagram showing an arrangement of a short wavelength light source as the first embodiment of the invention. A short wavelength light source shown in FIG. 1 includes a GaN-based semiconductor laser 1, a laser medium 2, multilayer film mirrors 3 and 4, a polarization switch 6, and a light collecting optical system 8. An optical resonator 30 includes the laser medium 2 and the multilayer film mirrors 3 and 4.

The GaN-based semiconductor laser 1 is a multi-stripe semiconductor laser. Pump light 7 to be emitted from the GaN-based semiconductor laser 1 is linearly polarized light. The wavelength of the pump light 7 is near 440 nm. The output of the GaN-based semiconductor laser 1 is 5 W. The GaN-based semiconductor laser 1 emits the pump light 7 of a wavelength near 440 nm. The light collecting optical system 8 collects the pump light 7 emitted from GaN-based semiconductor laser 1.

The multilayer film mirror 4 is so designed as to transmit light of a wavelength of 440 nm, and reflect light of a wavelength near 640 nm. After transmitted through the polarization switch 6, the pump light 7 outputted from the GaN-based semiconductor laser 1 is entered into the laser medium 2.

The laser medium 2 is doped with a trivalent praseodymium ion ($Pr^{3+}$). The laser medium 2 constitutes an optical resonator with the multilayer film mirrors 3 and 4, and laser light of a wavelength near 640 nm is subjected to laser oscillation and outputted as emission light 5 from the laser medium 2. The multilayer film mirrors 3 and 4 have a high reflectance characteristic with respect to light of a wavelength near 640 nm, and has a high transmittance characteristic with respect to light of a wavelength near 440 nm. Accordingly, light that has not been absorbed by the laser medium 2 is outputted to the exterior.

The laser medium 2 is excited by incidence of the pump light 7, and oscillates laser light having a wavelength near 640 nm. The multilayer film mirrors 3 and 4 constitute an optical resonator with the laser medium 2, and are disposed at such positions as to sandwich the laser medium 2 therebetween.

The GaN-based semiconductor laser 1 may emit the pump light 7 in a wavelength range of from 440 to 460 nm, and the laser medium 2 may emit the emission light 5 in a wavelength range of from 600 to 650 nm.

Further, the absorption characteristic of the laser medium 2 has a polarization dependency. Accordingly, the light intensity of laser oscillation can be adjusted by adjusting the polarization direction of the pump light 7 by the polarization switch 6. Thus, it is possible to adjust the intensity ratio between the emission light 5 of a wavelength near 640 nm from the laser medium 2, and the pump light 7, by using the polarization switch 6. The above arrangement enables to realize a 2-wavelength laser light source capable of simultaneously outputting red light and blue light, and changing the intensity ratio between red light and blue light.

The polarization switch 6 is operable to switch over at least one of polarization directions of first laser light (the pump light 7) and second laser light (the emission light 5) to thereby change the wavelength of laser light to be emitted from the optical resonator 30, or the intensity ratio between a plurality of laser light to be emitted from the optical resonator 30.

Specifically, the polarization switch 6 is operable to change the polarization direction of the pump light 7 or the emission light 5 to thereby emit one of the laser light i.e. the pump light 7 and the emission light 5 from the optical resonator 30, or thereby change the intensity ratio between the pump light 7 and the emission light 5 and emit both of the pump light 7 and the emission light 5 from the optical resonator 30. In the first embodiment, the polarization switch 6 is disposed between the GaN-based semiconductor laser 1, and the multilayer film mirror 4 on the incident side of the laser medium 2 to change the polarization direction of the pump light 7.

In the first embodiment, the GaN-based semiconductor laser 1 corresponds to an example of a laser light source, the 440 nm wavelength corresponds to an example of a first wavelength, the pump light 7 corresponds to an example of first laser light, the 640 nm wavelength corresponds to an example of a second wavelength, the emission light 5 corresponds to an example of second laser light, the laser medium 2 corresponds to an example of a solid-state laser medium, and the multilayer film mirrors 3 and 4 correspond to an example of a pair of mirrors.

Since the laser medium 2 for generating visible light such as Pr ions has a relatively small absorption coefficient, it is difficult to convert light from the laser medium 2 into laser light with high efficiency. On the other hand, in e.g. a color display device using red green, and blue light, the electric power consumption of the system as a whole can be reduced by effectively using pump light in addition to converted laser light.

In view of the above, in the short wavelength light source of this embodiment, even if the absorption rate of pump light by the laser medium 2 is not as high as near 100%, the pump light that could not be absorbed by the laser medium 2 can be effectively used by extracting the pump light to the exterior. Further, the optical system utilizing laser light can be simplified by emitting pump light and laser light substantially along an identical optical axis, which is advantageous in miniaturizing and simplifying the system.

The polarization switch 6 is capable of changing the polarization direction by using an electro-optical effect or an acousto-optical effect.

As described above, the GaN-based semiconductor laser 1 emits the first laser light (the pump light 7) of a single polarization and having the first wavelength. The optical resonator 30 includes the laser medium 2 which is exited by incidence of the pump light 7, and oscillates the second laser light (the emission light 5) having the second wavelength different from the first wavelength. The polarization switch 6 changes the polarization direction of the first laser light or the second laser light to thereby emit one of the laser light i.e. the first laser light and the second laser light from the optical resonator 30, or changes the intensity ratio between the pump light 7 and the emission light 5 to thereby emit both of the first laser light and the second laser light from the optical resonator 30.

Thus, the above arrangement enables to switch over between plural laser light to be emitted from the optical resonator, which is advantageous in effectively using the plural laser light. Further, since the above arrangement enables to simultaneously emit plural laser light having wavelengths different from each other from a single light source, the configuration of the optical system can be simplified.

Further, since the polarization switch 6 is disposed between the GaN-based semiconductor laser 1, and the multilayer film mirror 4 on the incident side of the laser medium 2, out of the multilayer film mirrors 3 and 4, the polarization direction of laser light can be changed before incidence of the laser light into the laser medium 2

Figure 2:
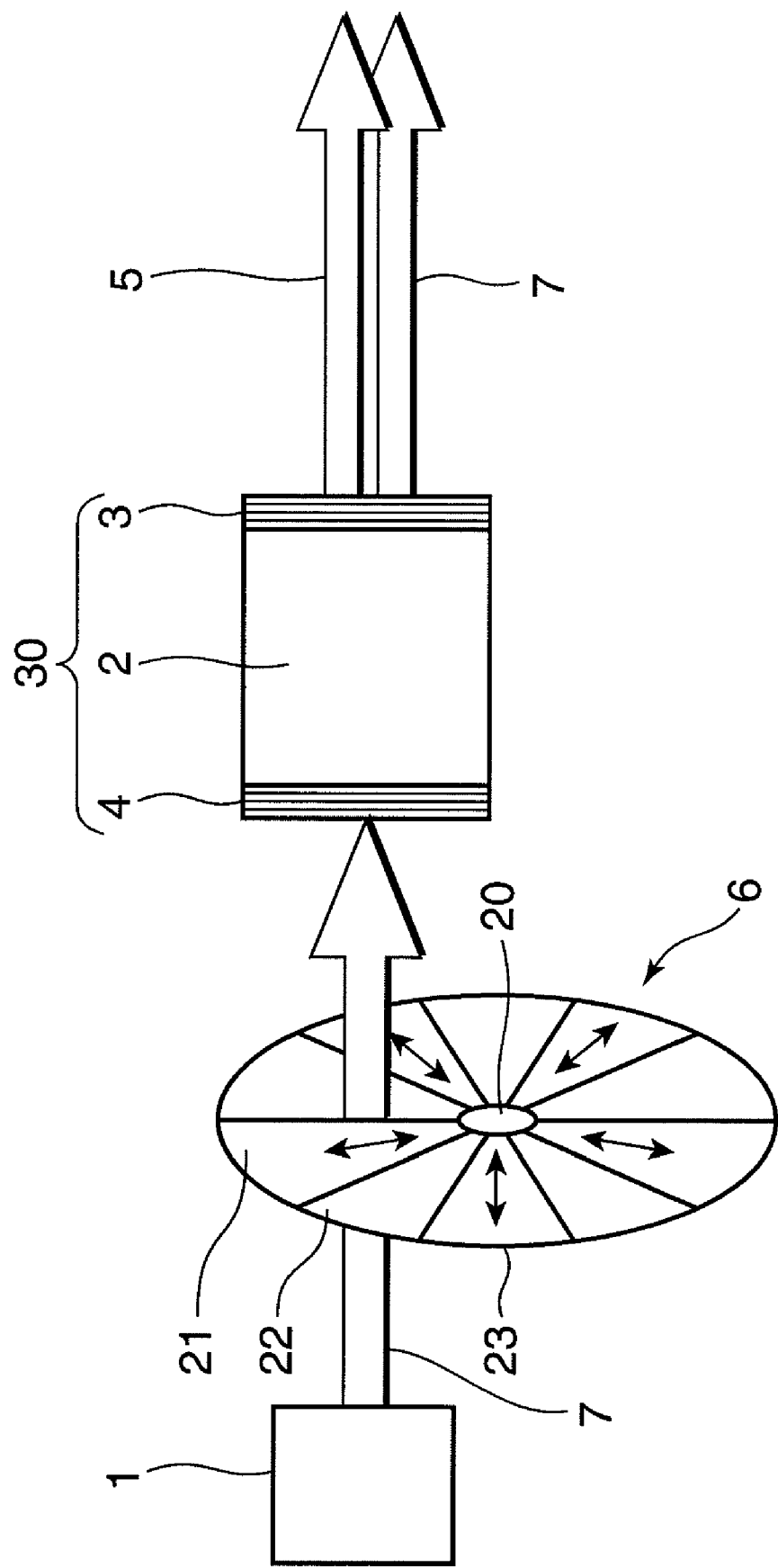
FIG. 2 is a diagram showing an arrangement of a short wavelength light source as a first modification of the first embodiment of the invention.

FIG. 2 is a diagram showing an arrangement of a short wavelength light source as a first modification of the first embodiment of the invention. In FIG. 2, like elements as in the short wavelength light source shown in FIG. 1 are indicated with like reference numerals, and description thereof is omitted herein.

As shown in FIG. 2, a polarization switch 6 may include a rotary shaft 20 extending in parallel to the optical axis of pump light 7, and a disc plate 23 which is rotatably mounted on the rotary shaft 20 and is formed by alternately attaching a half wavelength plate 21 and an optical substrate 22. The optical substrate 22 is a transparent substrate, and transmits the pump light 7 without changing its polarization direction. On the other hand, the half wavelength plate 21 is rotated the polarization direction of transparent light. Accordingly, the polarization direction of the pump light 7 is switched over by alternately transmitting the pump light 7 through the half wavelength plate 21 and the optical substrate 22.

The above arrangement enables to alternately change the intensities of emission light 5 and the pump light 7 to be outputted from a laser medium 2. The polarization axis of the half wavelength plate 21 may preferably be disposed perpendicularly to the rotary shaft 20 located at the center of the disc plate 23. The half wavelength plate 21 is so designed that the polarization direction of linearly polarized light is rotated by 90° in the case where light perpendicular to the polarization axis of the half wavelength plate 21 is entered. The above arrangement enables to constantly make the polarization direction of the half wavelength plate 21 identical to the polarization direction of light to be entered by aligning the polarization axis perpendicular to the axis of rotation of the disc plate 23.

In the first modification of the first embodiment, the disc plate 23 corresponds to an example of a wavelength plate.

Figure 3:
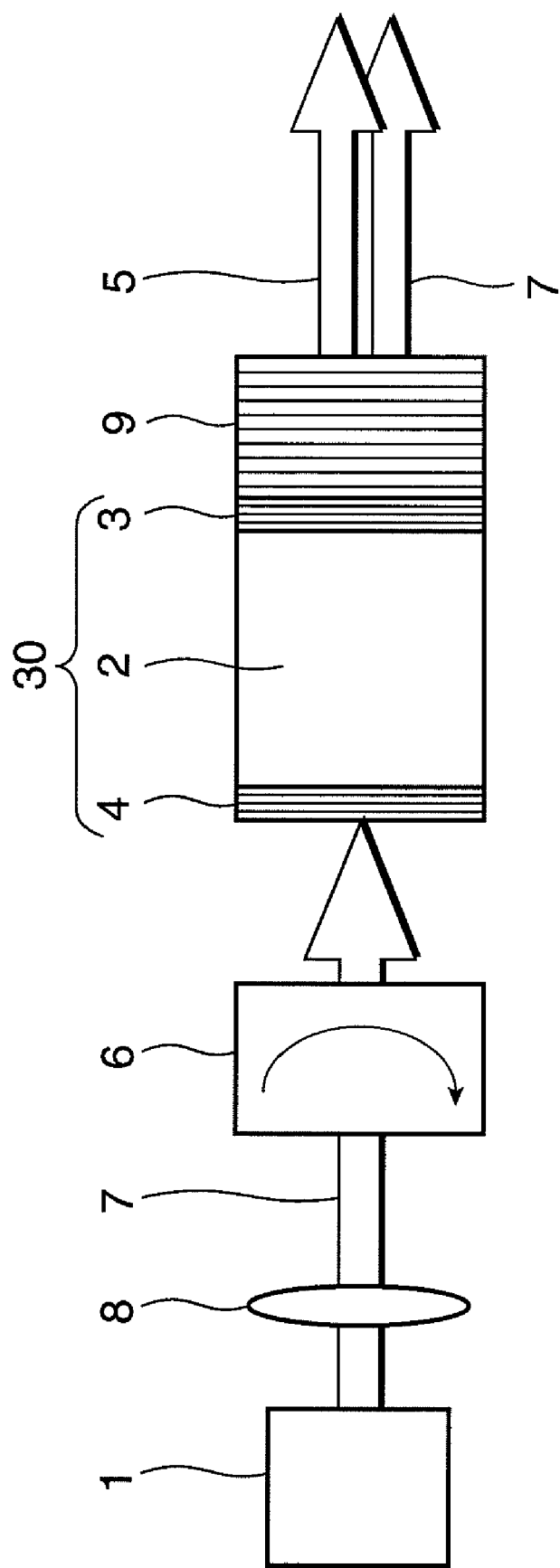
FIG. 3 is a diagram showing an arrangement of a short wavelength light source as a second modification of the first embodiment of the invention.

FIG. 3 is a diagram showing an arrangement of a short wavelength light source as a second modification of the first embodiment of the invention. In FIG. 3, like elements as in the short wavelength light source shown in FIG. 1 are indicated with like reference numerals, and description thereof is omitted herein. The arrangement of the short wavelength light source in the second modification is different from the arrangement of the short wavelength light source shown in FIG. 1 in that a reflecting member 9 is disposed on the output side of a multilayer film mirror 3 constituting an optical resonator.

The short wavelength light source shown in FIG. 3 includes a GaN-based semiconductor laser 1, a laser medium 2, multilayer film mirrors 3 and 4, a polarization switch 6, a light collecting optical system 8, and the reflecting member 9. The reflecting member 9 is constituted of a volume grating, and reflects light of a specific wavelength. The reflecting member 9 is disposed on the light exit side of an optical resonator, and reflects pump light 7. Light reflected on the reflecting member 9 is returned to an active layer of the GaN-based semiconductor laser 1, and locks the oscillation wavelength of the GaN-based semiconductor laser 1. Since the absorption spectrum of the laser medium 2 is narrow, high-efficiency excitation is enabled by locking the oscillation wavelength of the GaN-based semiconductor laser 1 by a wavelength locking mechanism. The oscillation wavelength of the GaN-based semiconductor laser 1 is also changed by a change in the ambient temperature. However, the arrangement of the embodiment incorporated with a wavelength locking mechanism is advantageous in realizing a stable output operation with respect to a change in the ambient temperature.

Figure 4:
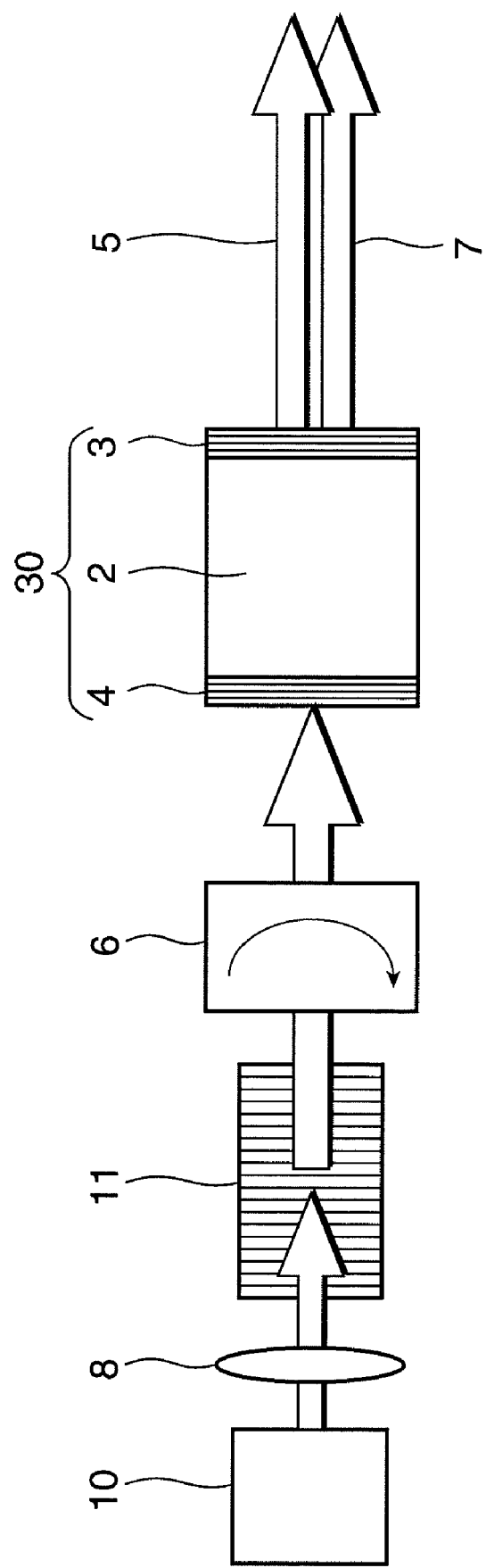
FIG. 4 is a diagram showing an arrangement of a short wavelength light source as a third modification of the first embodiment of the invention.

FIG. 4 is a diagram showing an arrangement of a short wavelength light source as a third modification of the first embodiment of the invention. In FIG. 4, like elements as in the short wavelength light source shown in FIG. 1 are indicated with like reference numerals, and description thereof is omitted herein. In the short wavelength light source as the third modification of the first embodiment, wavelength-converted laser light is used as pump light.

The short wavelength light source shown in FIG. 4 includes a GaN-based semiconductor laser 10, a laser medium 2, multilayer film mirrors 3 and 4, a polarization switch 6, a light collecting optical system 8, and a wavelength conversion element 11. The GaN-based semiconductor laser 10 is a high-output semiconductor laser for emitting pump light 7 of a wavelength near 960 nm. The wavelength conversion element 11 has a cyclic polarization inversion structure, and is composed of an MgO-doped $LiNbO_3$ (MgLN) crystal. The wavelength conversion element 11 converts the pump light 7 into a harmonic.

The pump light 7 emitted from the GaN-based semiconductor laser 10 is subjected to wavelength conversion by the wavelength conversion element 11 into laser light having a wavelength of 480 nm. The praseodymium (Pr)-doped laser crystal (the laser medium 2) can be subjected to high-efficiency wavelength conversion, because the laser crystal has an absorption characteristic with respect to light having a wavelength near 480 nm. The polarization switch 6 is operable to switch over the polarization direction of wavelength-converted light. The above arrangement enables to modulate the intensity ratio between laser light having a wavelength near 640 nm i.e. the emission light 5 from the laser medium 2, and blue-green light having a wavelength of 480 nm i.e. the pump light 7 from the laser medium 2 i.e. modulate the intensity ratio between two wavelength outputs.

In the short wavelength light source shown in FIG. 4, the wavelength conversion element 11 and the polarization switch 6 are formed independently of each other. The invention is not specifically limited to the above. It is possible to rotate the polarization direction of incident light by forming electrodes on an MgLN crystal and applying a voltage to the electrodes. Thus, the wavelength conversion element 11 and the polarization switch 6 may be formed as one unit. Forming a wavelength conversion element and a polarization switch as one unit is advantageous in miniaturizing the device.

In the short wavelength light source as the third modification of the first embodiment, the wavelength conversion element 11 is disposed between the GaN-based semiconductor laser 10 and the polarization switch 6. The invention is not specifically limited to the above. The wavelength conversion element 11 may be disposed on the exit side of the multilayer film mirror 3. In the above modification, the wavelength conversion element 11 converts the pump light 7 or the emission light 5 into a harmonic by switching over the polarization direction by the polarization switch 6.

Next, a fourth modification of the first embodiment is described, wherein the generation efficiency of laser light is improved by increasing the absorption coefficient of a laser medium.

Figure 5:
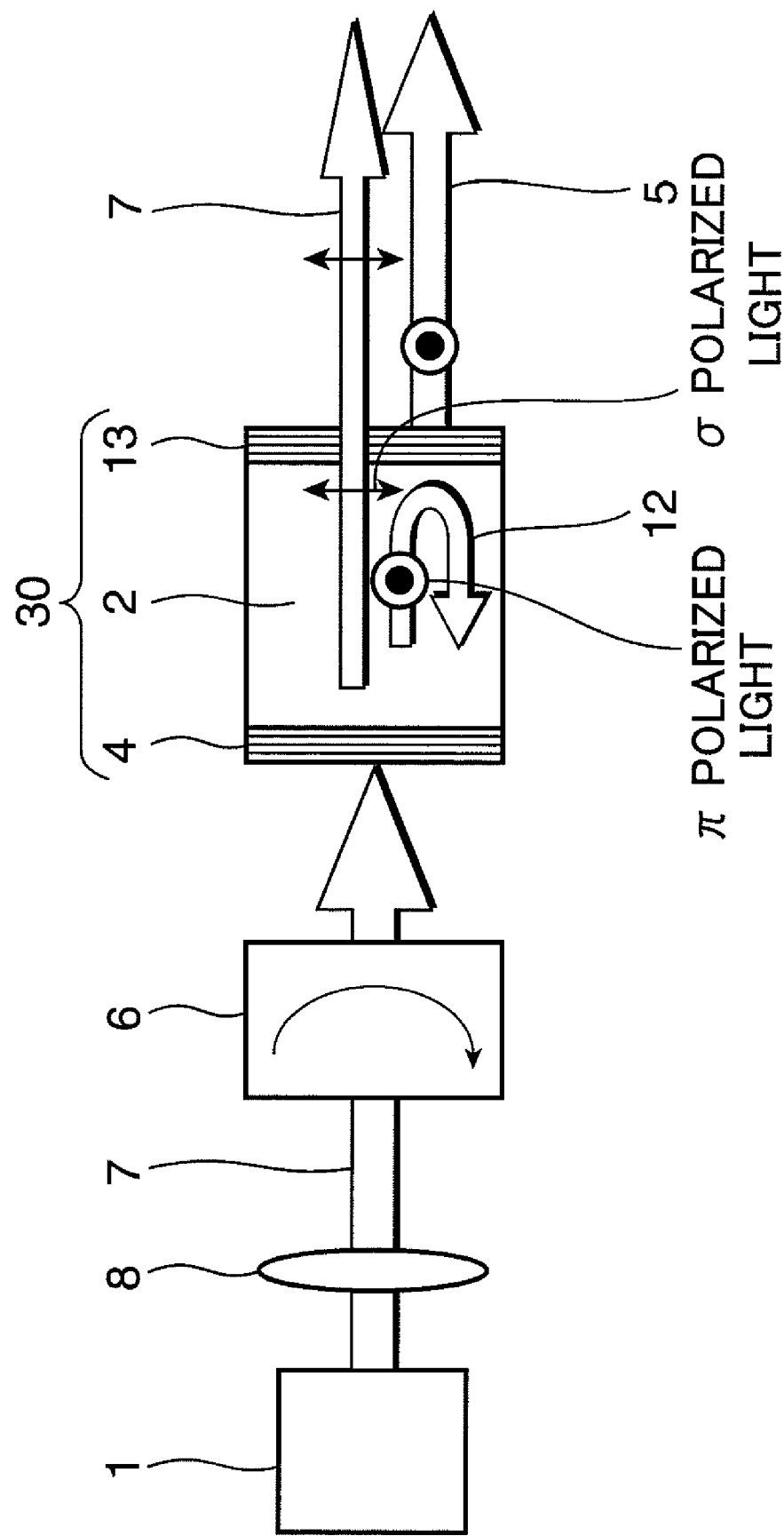
FIG. 5 is a diagram showing an arrangement of a short wavelength light source as a fourth modification of the first embodiment of the invention.

FIG. 5 is a diagram showing an arrangement of a short wavelength light source as the fourth modification of the first embodiment of the invention. In FIG. 5, like elements as in the short wavelength light source shown in FIG. 1 are indicated with like reference numerals, and description thereof is omitted herein. The arrangement of the short wavelength light source as the fourth modification of the first embodiment has a feature that a multilayer film mirror 13 having a polarization characteristic is provided, in place of the multilayer film mirror 3 having the arrangement as shown in FIG. 1.

The short wavelength light source shown in FIG. 5 includes a GaN-based semiconductor laser 1, a laser medium 2, a multilayer film mirror 4, a polarization switch 6, a light collecting optical system 8, and the multilayer film mirror 13. An optical resonator 30 includes the laser medium 2, and the multilayer film mirrors 4 and 13. Pump light 7 emitted from the GaN-based semiconductor laser 1 and having a wavelength near 440 nm is transmitted through the multilayer film mirror 4 and absorbed by the laser medium 2.

The π polarized light having a polarization direction in parallel to the C-axis of the laser medium 2 has a large absorption coefficient with respect to the laser medium 2. Accordingly, the pump light 7 is efficiently absorbed by the laser medium 2, in the case of the π polarized light. On the other hand, in the case of the σ polarized light having a polarization direction perpendicular to the polarization direction of the π polarized light, the absorption coefficient of the laser medium 2 is considerably lowered, and the amount of light by laser oscillation is small. In the fourth modification of the first embodiment, providing the multilayer film mirror 13 having a polarization characteristic enables to further enhance the oscillation efficiency of the laser medium 2.

The multilayer film mirror 13 has a polarization dependency of reflecting the π polarized light that has been transmitted through the laser medium 2, and transmitting the σ polarized light. Due to the polarization dependency, the pump light 7 as the π polarized light is reflected on the multilayer film mirror 13, and reflection light 12 is absorbed by the laser medium 2 again, which increases the absorption rate, and increases the conversion efficiency into laser light. On the other hand, since the absorption coefficient of the pump light 7 as the σ polarized light with respect to the laser medium 2 is small, and the pump light 7 is transmitted through the multilayer film mirror 13, the pump light 7 can be effectively extracted. As a result, the extinction ratio between the pump light 7 and the emission light 5 to be switched over by the polarization switch 6 is remarkably increased, and the conversion efficiency from the pump light 7 into the emission light 5 is significantly increased.

In the fourth modification of the first embodiment, the exit-side multilayer film mirror 13 has a polarization dependency. The invention is not specifically limited to the above. The incident-side multilayer film mirror 4 may have a polarization dependency. Further alternatively, both of the incident-side multilayer film mirror 4 and the exit-side multilayer film mirror 13 may have a polarization dependency. In the above modification, since at least one of the multilayer film mirrors 4 and 13 has a polarization dependency, it is possible to enhance the absorption efficiency of the pump light 7 with respect to the laser medium 2, and the transmittance efficiency of the pump light 7 with respect to the multilayer film mirrors 4 and 13, and effectively use a plurality of laser light.

Examples of the laser medium 2 are an $LiYF_4$ crystal and an $LiLuF_4$ crystal. In these laser crystals, the absorption efficiency of the pump light 7 is increased, in the case where the laser crystals are excited by the π polarized light having a polarization direction in parallel to the C-axis of the laser crystal. Accordingly, the excitation efficiency can be controlled depending on the polarization direction of excitation light. Further, if the laser crystal is excited by polarized light having a small absorption coefficient, the absorption efficiency of the pump light 7 is greatly lowered. The above arrangement enables to extract and use the pump light 7 that has not been absorbed by the laser crystal.

In particular, since the $LiLuF_4$ crystal has a strong polarization dependency to the pump light 7, it is possible to efficiently modulate the intensities of the pump light 7 and the emission light 5. In the case of using a $Pr^{3+}$-doped $LiLuF_4$ crystal, the absorption coefficient of the π polarized light with respect to the pump light 7 having a wavelength of 445 nm is about 5 $cm^{-1}$, the absorption coefficient of the σ polarized light is about 0.8 $cm^{-1}$, the absorption coefficient of the π polarized light with respect to the pump light 7 having a wavelength of 480 nm is about 13 $cm^{-1}$, and the absorption coefficient of the σ polarized light is 0.1 $cm^{-1}$ or less.

The laser medium 2 may be composed of an $LiYF_4$ crystal or an $LiLuF_4$ crystal doped with a Pr ion. The $LiYF_4$ crystal or the $LiLuF_4$ crystal doped with a Pr ion has a large absorption efficiency, in the case where the laser crystal is excited by the π polarized light having a polarization direction in parallel to the C-axis of the laser crystal. Accordingly, the above arrangement enables to control the excitation efficiency depending on the polarization direction of excitation light.

As described above, since the absorption coefficient of the laser medium 2 greatly differs depending on a polarization direction of the pump light 7, it is possible to allow the pump light 7 to pass through the laser medium 2, or convert the pump light 7 into laser light (the emission light 5) by the polarization switch 6. Thus, the above arrangement enables to switch over the wavelength of output light as a laser light source, or adjust the intensity ratio between the output light.

Figure 6:
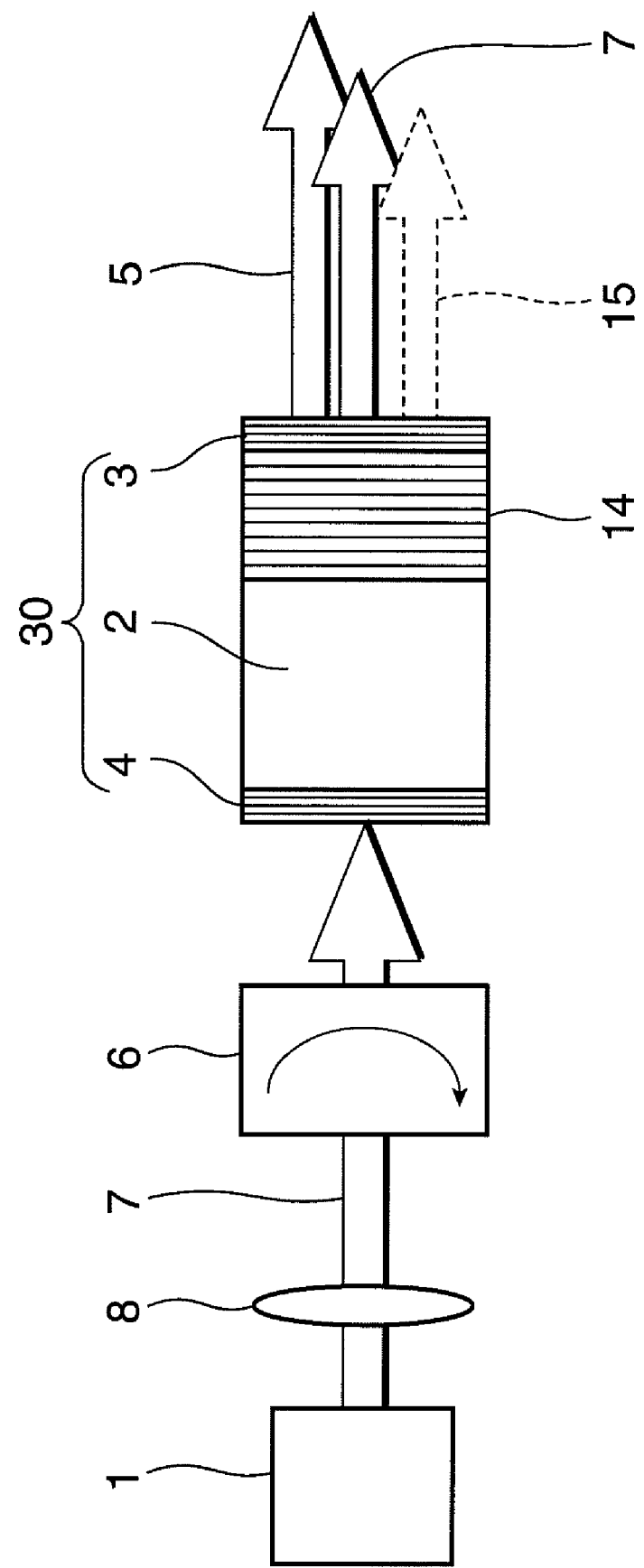
FIG. 6 is a diagram showing an arrangement of a short wavelength light source as a fifth modification of the first embodiment of the invention.

Next, a fifth modification of the first embodiment, wherein wavelength conversion is performed inside an optical resonator, is described referring to FIG. 6.

FIG. 6 is a diagram showing an arrangement of a short wavelength light source as the fifth embodiment of the first embodiment of the invention. In FIG. 6, like elements as in the short wavelength light source shown in FIG. 1 are indicated with like reference numerals, and description thereof is omitted herein. The short wavelength light source shown in FIG. 6 includes a GaN-based semiconductor laser 1, a laser medium 2, multilayer film mirrors 3 and 4, a polarization switch 6, a light collecting optical system 8, and a non-linear optical crystal 14.

Referring to FIG. 6, the non-linear optical crystal 14 is provided inside an optical resonator. A wavelength conversion element (the non-linear optical crystal 14) converts an output of the laser medium 2 into a second harmonic 15. In this example, the wavelength of a fundamental wave (pump light 7) is set to 440 nm, the oscillation wavelength of the laser medium 2 is set to 640 nm, and the wavelength of the second harmonic 15 is set to 320 nm. Providing the non-linear optical crystal 14 between the laser medium 2 and the multilayer film mirror 3 enables to emit light of three different wavelengths.

Further, by controlling the polarization of the pump light 7 by the polarization switch 6, it is possible to control the intensity ratio between the pump light 7, the second harmonic 15, and emission light 5. Examples of the non-linear optical crystal 14 are LBO and BBO, but use of $LiTaO_3$ (LT) or MgO-doped $LiTaO_3$ (MgLT) having a cyclic polarization inversion structure may be effective. Since LT and MgLT have a large non-linear constant, and the wavelength at an absorption end thereof is as short as 280 nm, UV light can be subjected to wavelength conversion with high efficiency. Further, since the growth of a large crystal can be secured, the above arrangement is advantageous in reducing the cost.

Concerning the non-linear optical crystal 14, there was found a phenomenon that visible light is absorbed by irradiation of light having a wavelength of 400 nm or less. It is effective to use a Mg-doped LT as the non-linear optical crystal 14, as a method for preventing absorption of visible light. Since absorption of visible light is remarkably reduced by setting the doped amount of Mg to 7 mol % or less, and keeping the temperature of the crystal at 50° C. or higher, stable UV output can be obtained. As a configuration of the short wavelength light source, stably using the optical resonator including the laser medium 2 and the non-linear optical crystal 14 at a temperature of 50° C. or higher enables to stably output UV light of a high output over 100 mW.

In the arrangement of the embodiment, a volume grating mirror may be used in place of the multilayer film mirror 3. The volume grating mirror has a reflectance characteristic with respect to light of a specific wavelength. Accordingly, using a volume grating mirror having a reflectance characteristic with respect to light having a wavelength near 640 nm, as an oscillation wavelength of the laser medium 2, enables to transmit the pump light 7. Further, use of the volume grating mirror is advantageous in providing a polarization characteristic by forming a wavelike grating structure. Thus, as shown in FIG. 6, use of the volume grating mirror, in place of the multilayer film mirror 3, is advantageous in easily realizing an arrangement of reflecting the pump light 7 by polarization.

Use of a reflecting member having a reflectance characteristic with respect to light in a broad wavelength region including the oscillation gain of a laser enables to expand the oscillation spectrum of the laser, and reduce speckle noises. Another feature of the volume grating mirror is that it is possible to design a mirror having a reflectance characteristic with respect to light of plural wavelengths. The Pr-doped laser medium 2 has an oscillation line near a wavelength of 530 nm, in addition to a wavelength of 640 nm. Accordingly, in the case where the volume grating mirror has a reflectance characteristic with respect to both of light having a wavelength of 640 nm and light having a wavelength of 530 nm, the short wavelength light source serves as a 3-wavelength light source for simultaneously generating light of three colors of RGB.

The volume grating mirror having a polarization characteristic can be realized by forming a two-dimensional photonic crystal structure. Specifically, it is possible to form, on a surface of a layer to be laminated, a cyclic structure having a cycle identical to the cycle of the cyclic structure of a glass substrate by alternately laminating inorganic materials of two kinds on the glass substrate having a cyclic concave and convex structure by a self cloning method. The above arrangement enables to form a two-dimensional photonic crystal structure, and fabricate a volume grating mirror having a polarization characteristic.

In the case where a laser light source is used in a display device, the image quality may be deteriorated resulting from speckle noises. As a method for preventing speckle noises, it is effective to reduce the coherence of laser light by expanding the oscillation spectrum of laser light. Examples of the method for expanding the oscillation spectrum are pulse-modulating pump laser light, and pulse-oscillating laser light by providing a saturated absorbent inside an optical resonator. The above methods may be applied to the arrangement of this embodiment.

In the arrangement of this embodiment, it is possible to pulse-oscillate laser light by modulation by the polarization switch 6 to thereby expand the oscillation spectrum. A switch capable of performing a high-speed switching operation, such as an electro-optical (EO) switch or an acousto-optical (AO) switch, is necessary as the polarization switch 6. Since switching over the polarization direction at a modulation speed of several kHz or more enables to time-wise change the absorption rate of the interior of the laser medium, the oscillation state of laser light is changed to thereby expand the oscillation spectrum. The above arrangement enables to lower the coherence of laser light, and reduce speckle noises, which is advantageous in displaying a high-quality image.

The Pr-doped laser medium 2 has an oscillation wavelength in a red light wavelength region of from 600 to 660 nm, and in a green light wavelength region of from 515 to 555 nm, although the oscillation wavelength differs depending on the kind of the laser medium. By utilizing the above characteristic, a light source for a laser display can be realized. Further, considering the color reproducibility of a display device, it is preferable to set the wavelength of green light in the range of from 520 to 540 nm, and set the wavelength of red light in the range of from 620 to 640 nm.

Figure 7:
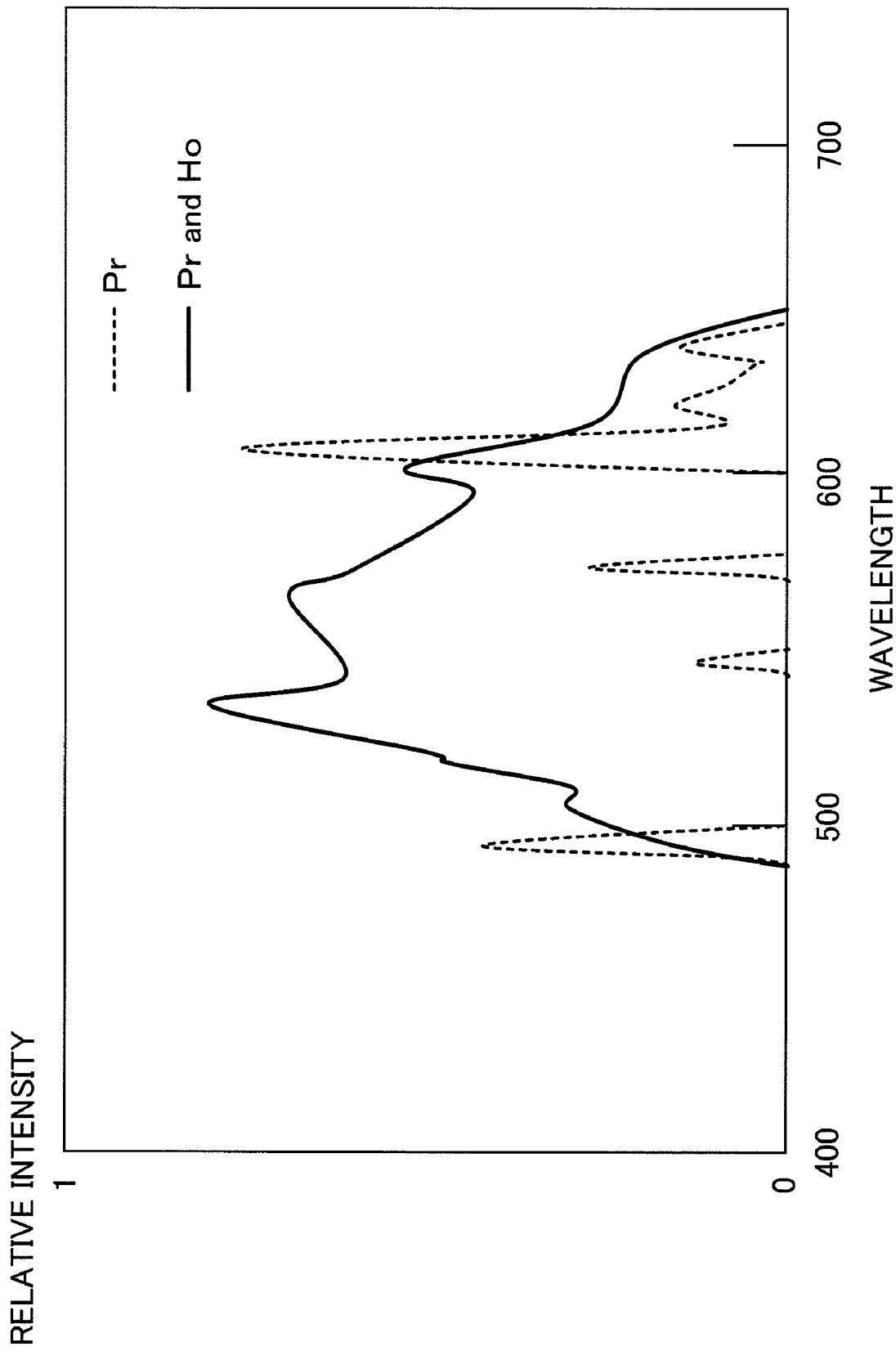
FIG. 7 is a diagram showing fluorescence spectral profiles, in the case where Pr is doped, and in the case where Pr and Ho are co-doped, while using a ceramic YAG as a matrix.

Further, co-doping with another substance into the $Pr^{3+}$-doped laser medium 2 enables to promote multiplication of the longitudinal mode. FIG. 7 is a diagram showing fluorescence spectral profiles in the case where Pr is doped, and in the case where Pr and holmium (Ho) are co-doped, while using a ceramic YAG as a matrix. Referring to FIG. 7, the axis of abscissas indicates a wavelength, and the axis of ordinate indicates a relative intensity. Further, the broken line in FIG. 7 indicates a fluorescence spectral profile in the case where only Pr is doped, and the solid line in FIG. 7 indicates a fluorescence spectral profile in the case where Pr and Ho are doped. As shown in FIG. 7, co-doping Pr and Ho provides the laser medium 2 with a strong fluorescence characteristic in a very wide wavelength range of from about 500 nm to about 650 nm, which is advantageous in performing laser oscillation.

The above arrangement enables to secure an oscillation spectrum in a wide wavelength range with high efficiency. Use of the laser medium 2 capable of emitting light of plural wavelengths as in the embodiment enables to realize a high-efficiency and low-coherent light source, which is advantageous in securing a miniaturized and high-output light source. The doped amount of Pr in the range of from about 1 to about 3 at % is effective, and the doped amount of Ho in the range of from about 1 to about 3 at % is effective.

As a matrix, it is effective to use e.g. YLF ($LiYF_4$), $YVO_4$, or a glass material, other than YAG. A crystal structure may also be effective as a matrix, but a ceramic material may also be used. Use of the ceramic material is effective in providing a high-efficiency and low-cost light source, because the ceramic material is capable of increasing the amount of a dopant such as Pr and Ho, and a matrix can be easily formed of the ceramic material.

The laser medium 2 in the first embodiment is formed by doping Pr and Ho into a matrix. The invention is not specifically limited to the above. Pr may be doped with a material such as ytterbium (Yb), neodymium (Nd), erbium (Er), or chrome (Cr), other than Ho. Even in the case where Yb, Nd, Er, or Cr may be doped with Pr into a matrix, the absorption coefficient of the laser medium 2 is increased, and the excitation efficiency is improved, which is advantageous in attaining high-efficiency.

In the arrangement of the first embodiment, the $Pr^{3+}$-doped laser medium 2 is used. Alternatively, it is effective to use a solid-state laser crystal doped with at least one selected from the group consisting of a trivalent europium ion ($Eu^{3+}$), a trivalent samarium ion ($Sm^{3+}$), a trivalent cerium ion ($Ce^{3+}$), a trivalent thulium ion ($Tm^{3+}$), a trivalent terbium ion ($Tb^{3+}$), and a bivalent europium ion ($Eu^{2+}$).

For instance, with use of the $Eu^{3+}$-doped laser medium 2, red light of a wavelength near 615 nm can be obtained by using f-f absorption by pump light of a wavelength near 400 nm, and transition from 5D0 to 7F2. It is also possible to emit light in a red wavelength region by using $Sm^{3+}$. The pump light of a wavelength near 400 nm is advantageous in optimizing the amount of In in an InGaN-based semiconductor laser. Thus, a high-output, durable, and reliable semiconductor laser can be used as a pump light source.

Further, use of the short wavelength light source in the first embodiment is free from e.g. efficiency deterioration in a high temperature condition and characteristic deterioration in a high-output condition, which is likely to occur in a red semiconductor laser. Thus, the short wavelength light source in the first embodiment has an excellent characteristic as a light source for a display device, because the short wavelength light source has a less wavelength fluctuation resulting from a temperature change. In the case where $Ce^{3+}$, $Eu^{2+}$, or $Tm^{3+}$ is used, it is possible to generate blue light of a wavelength near 450 nm, and in the case where $Tb^{3+}$ is used, it is possible to generate green light of a wavelength near 543 nm.

Co-doping these ions of one or more kinds enables to control the oscillation wavelength and simultaneously generate a plurality of light having different wavelengths from each other. As a result, the multiplication of the mode of the oscillation spectrum progresses, and an effect of reducing speckle noises is increased. Further, the above arrangement is advantageous in widening the color reproducible range of a display device by outputting a plurality of light having different wavelengths from each other. Furthermore, the above arrangement is advantageous in improving the emission efficiency by energy transfer between ions by co-doping ions of various kinds.

In the first embodiment, described is a case, wherein the oscillation wavelength of the laser medium 2 is near 640 nm. Alternatively, it is possible to emit light of a wavelength near 530 nm. Since it is difficult to directly emit green laser light by using a solid-state laser medium, the arrangement of the first embodiment is advantageously used in a wide application range.

In the arrangement of the first embodiment, described is a case, wherein a single laser medium 2 is provided. Alternatively, it is also effective to use plural laser media or plural ion dopants. Providing plural laser media inside an optical resonator allows for oscillation of light at different wavelengths from each other.

Figure 8:
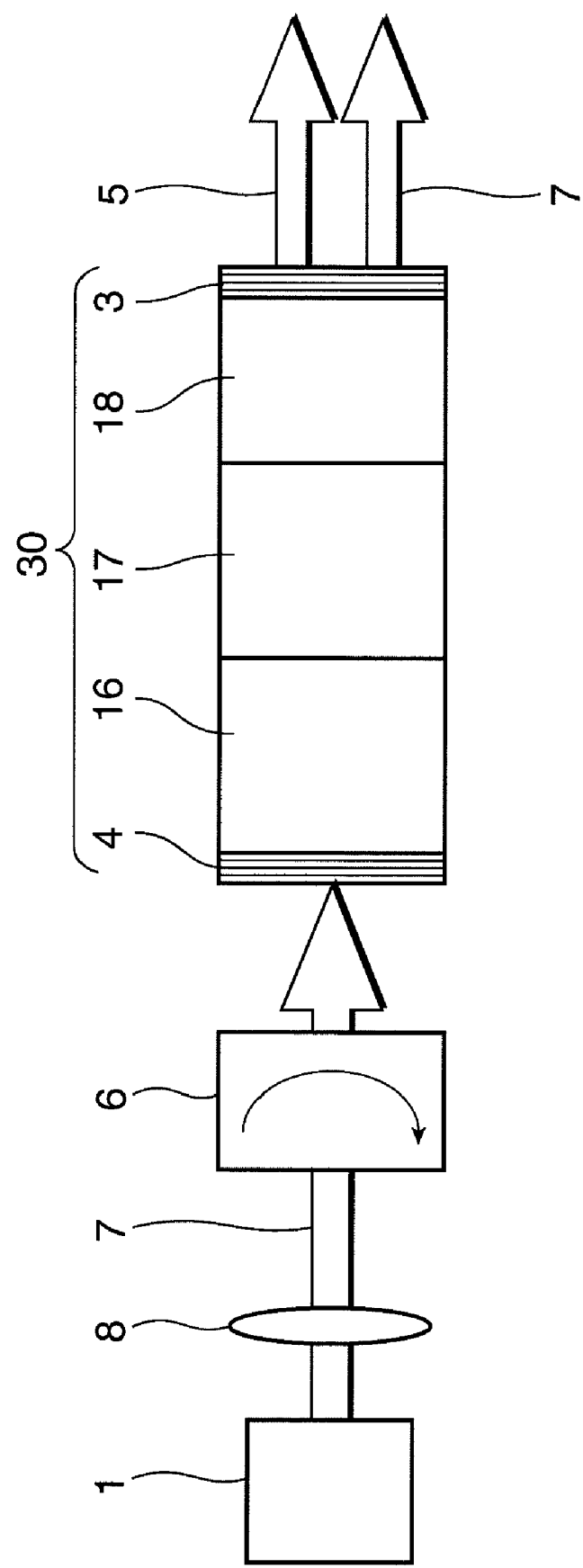
FIG. 8 is a diagram showing an arrangement of a short wavelength light source as a sixth modification of the first embodiment of the invention.

Next, a sixth modification of the first embodiment is described, wherein three laser media are provided inside a single optical resonator. FIG. 8 is a diagram showing an arrangement of a short wavelength light source as the sixth modification of the first embodiment of the invention. In FIG. 8, like elements as in the short wavelength light source shown in FIG. 1 are indicated with like reference numerals, and description thereof is omitted herein.

The short wavelength light source shown in FIG. 8 includes a GaN-based semiconductor laser 1, multilayer film mirrors 3 and 4, a polarization switch 6, a light collecting optical system 8, a first laser medium 16, a second laser medium 17, and a third laser medium 18. An optical resonator 30 includes the first laser medium 16, the second laser medium 17, the third laser medium 18, and the multilayer film mirrors 3 and 4.

The short wavelength light source as the sixth modification of the first embodiment is provided with the first laser medium 16, the second laser medium 17, and the third laser medium 18 between the multilayer film mirrors 3 and 4. The first laser medium 16 is composed of a $Tb^{3+}$-doped solid-state laser crystal, and generates laser light having a wavelength of 543 nm. The second laser medium 17 is composed of a $Pr^{3+}$-doped solid-state laser crystal, and generates laser light having a wavelength of 630 nm. The third laser medium 18 is composed of a $Eu^{2+}$-doped solid-state laser crystal, and generates laser light having a wavelength of 450 nm. Incorporating the short wavelength light source in a display device enables to display an RGB image. In this modification, the multilayer film mirrors 3 and 4 constituting an optical resonator are designed to reflect all the light of the respective wavelengths.

In the case where $Pr^{3+}$ is doped, it is also possible to generate laser light having a wavelength of 490 nm. Accordingly, the above arrangement enables to display a four-color image, in addition to the three-color image. Accordingly, the color reproducible range of the display device is increased by about 1.3 times.

The above arrangement enables to emit laser light of plural wavelengths by using plural laser media whose compositions are different from each other to thereby enhance the color reproducible range. Further, the above arrangement enables to emit laser light of three different colors of red, green, and blue, or oscillate laser light of four different colors, which is advantageous in widening the application range as a light source for a display device.

Second Embodiment

Figure 9:
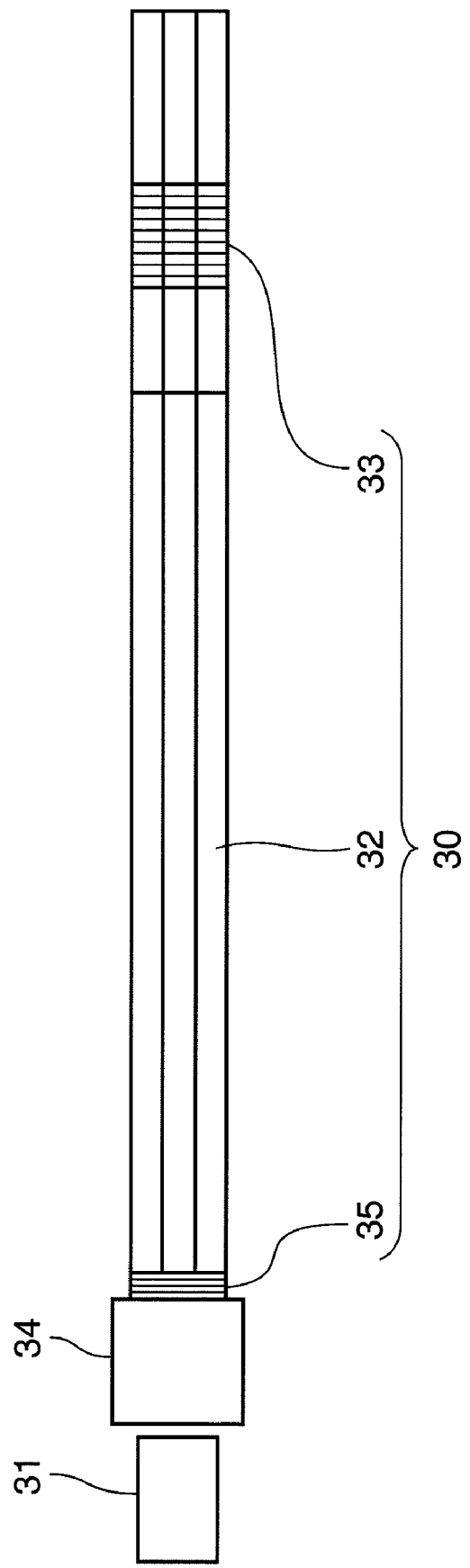
FIG. 9 is a diagram showing an arrangement of a short wavelength light source as a second embodiment of the invention.

In this section, described is a short wavelength light source incorporated with a doped fiber (a double clad fiber), as an arrangement of the second embodiment of the invention. FIG. 9 is a diagram showing an arrangement of the short wavelength light source as the second embodiment of the invention.

The short wavelength light source shown in FIG. 9 includes a GaN-based semiconductor laser 31, a double clad fiber 32 including a $Pr^{3+}$-doped solid-state laser crystal as a core portion, a grating fiber 33, a polarization switch 34, and a reflection mirror 35.

The GaN-based semiconductor laser 31 emits pump light having a wavelength near 440 nm. Light of a wavelength near 440 nm which is emitted from the GaN-based semiconductor laser 31, is transmitted through the polarization switch 34 and the reflection mirror 35, and is guided into the double clad fiber 32. Excitation light is absorbed into Pr ions doped in the core portion of the double clad fiber 32. As a result of the above operation, green light of a wavelength near 530 nm is generated from the double clad fiber 32.

An optical resonator 30 includes the double clad fiber 32, the reflection mirror 35 mounted on the incident end surface of the double clad fiber 32, and the grating fiber 33 mounted on the exit end surface of the double clad fiber 32.

In response to a switching operation by the polarization switch 34 to switch over the polarization direction of excitation light, the absorption rate of the double clad fiber 32 is changed to thereby change the intensity ratio between green light and blue light to be outputted. In this case, it is desirable to dispose the double clad fiber 32 substantially in a linear state, while suppressing a flexure thereof. If an optical fiber is bent with a large curvature, the polarization of pump light propagating through the fiber is changed inside the fiber. It is desirable to provide an arrangement of increasing the curvature of a fiber, or an arrangement of disposing a fiber substantially in a linear state in order to prevent the above drawback. Further, use of the fiber-type polarization switch 34 is advantageous in simplifying the construction of the light source as a whole, and reducing the connection loss.

Further, the double clad fiber 32 can achieve high output by providing plural core portions. The high output of a fiber is restricted by the power density within the fiber. In particular, since it is difficult to enhance the power density of a fiber laser in a visible light region, as compared with a fiber laser in an infrared region, it is necessary to increase the core diameter and reduce the power density so as to achieve high output. However, if the fiber diameter is unduly increased, the mode is rapidly multiplied, with the result that light of a large number of transverse modes propagates in the fiber. In this state, the excitation energy is dispersed by a large number of transverse modes, which lowers the oscillation efficiency, and makes it difficult to reflect light with a large reflectance in the grating fiber 33. Thus, laser oscillation itself is made difficult.

The above problem can be solved by providing plural core portions. If plural core portions are provided in an ordinary fiber laser, the quality of the output mode may be lowered, and the light collecting characteristic may be deteriorated. However, if such a fiber laser is used in a display device, deterioration of the quality of the mode does not matter. Accordingly, high output can be achieved by lowering the power density of the respective core portions and collecting light to be outputted from the respective core portions.

Further, providing plural core portions is advantageous in achieving high efficiency. Use of a high-efficiency fiber laser is advantageous in enhancing the absorption efficiency of blue light propagating through a clad portion. By providing plural core portions in the double clad fiber 32, the ratio of sectional areas of the core portions with respect to a clad portion is increased, which increases the absorption coefficient of clad light by several times. By providing plural core portions with respect to light propagating through a clad portion, it is possible to dispose the respective core portions in cross section of the double clad fiber 32 at a position displaced from an axially center position, which makes it possible to dispose the plural core portions in an asymmetrical position.

If a core portion of a fiber is located at an axially center position, there is generated an axially symmetrical mode of light propagating through a clad portion, while avoiding the core portion, which may lower light absorption by the clad portion. However, by providing plural core portions, it is easy to dispose the core portions in an asymmetrical position, and the absorption efficiency of light propagating through the clad portion can be increased. Thus, the above arrangement enables to enhance the oscillation efficiency of the double clad fiber 32.

It is possible to generate light of different wavelengths from plural core portions by changing the materials constituting the core portions or the materials to be doped. Differentiating the oscillation wavelengths enables to expand the oscillation spectrum, and reduce speckle noises. Further, a multi-color light source can be realized by emitting light of different wavelengths from the core portions. Similarly to the above, in this case, modulating pump light and light for laser oscillation depending on the polarization enables to enhance the use efficiency of laser light, while effectively using the pump light.

In the second embodiment, the core portions of the double clad fiber 32 are composed of a $Pr^{3+}$-doped solid-state laser crystal. The invention is not limited to the above. The core portions of the double clad fiber 32 may be a solid-state laser crystal doped with at least one selected from the group consisting of $Pr^{3+}$, $Eu^{3+}$, $Sm^{3+}$, $Ce^{3+}$, $Tm^{3+}$, $Tb^{3+}$, and $Eu^{2+}$.

As described above, since there is used the double clad fiber 32 including a solid-state laser crystal doped with at least one selected from the group consisting of $Pr^{3+}$, $Eu^{3+}$, $Sm^{3+}$, $Ce^{3+}$, $Tm^{3+}$, $Tb^{3+}$, and $Eu^{2+}$ as the core portions, it is possible to generate light of an intended wavelength from the double clad fiber 32.

In the second embodiment, a doped fiber (the double clad fiber 32) is used as a laser medium. Alternatively, an arrangement substantially the same as the above arrangement can be realized by a waveguide laser incorporated with an optical waveguide shown in FIG. 10.

Figure 10:
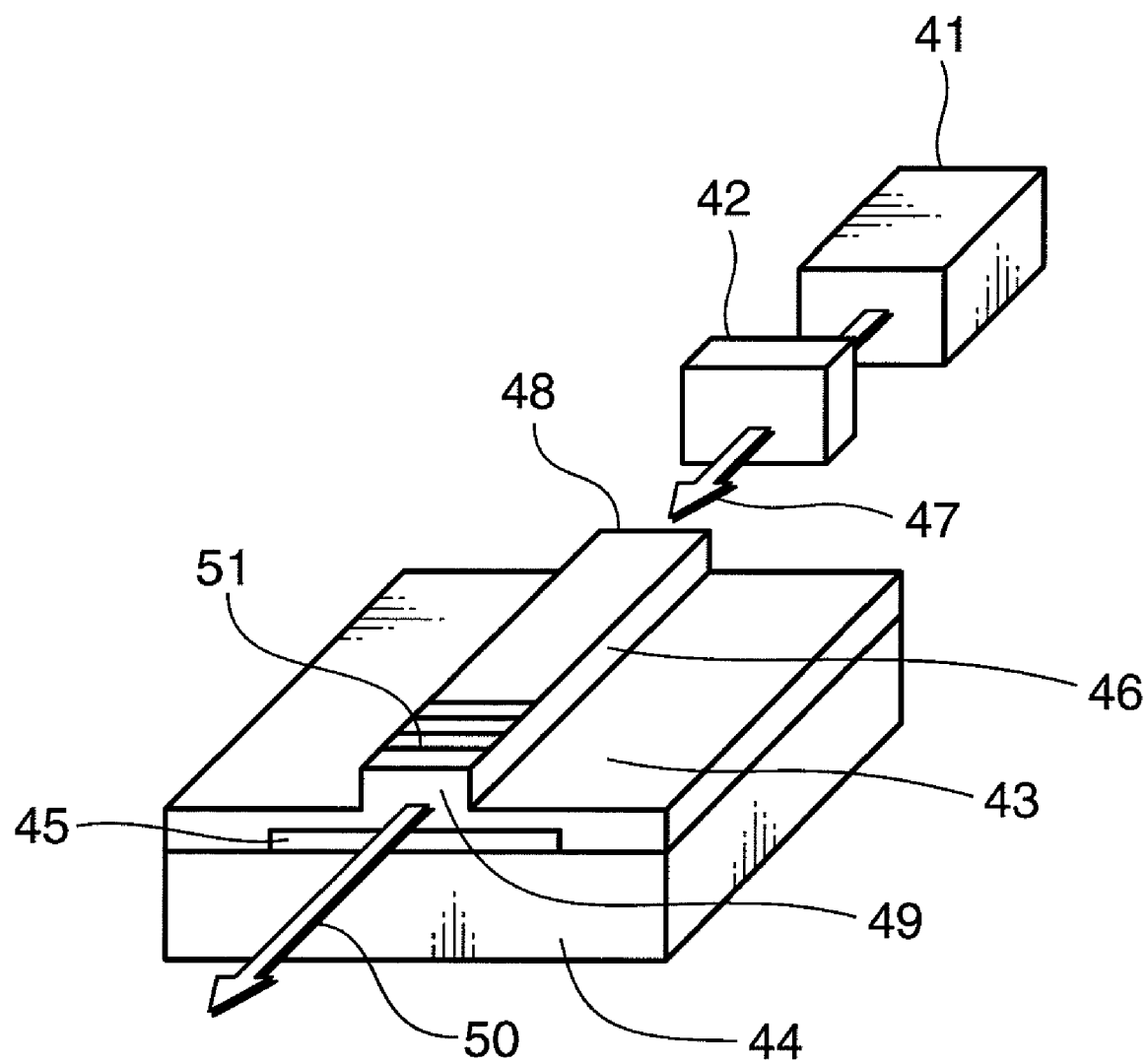
FIG. 10 is a diagram showing an arrangement of a short wavelength light source as a modification of the second embodiment of the invention.

FIG. 10 is a diagram showing an arrangement of a short wavelength light source as a modification of the second embodiment of the invention. The short wavelength light source shown in FIG. 10 includes a GaN-based semiconductor laser 41, a polarization switch 42, a laser medium 43, and a substrate 44.

The laser medium 43 is composed of a Pr-doped solid-state laser crystal, and is attached to the substrate 44 by direct cementing. A gap portion 45 is defined between the laser medium 43 and the substrate 44, and the laser medium 43 and the substrate 44 are optically separated from each other by the gap portion 45. Processing the laser medium 43 into ridges forms a ridged waveguide 46.

Upon incidence of incident light 47 from the GaN-based semiconductor laser 41 into the ridged waveguide 46, the laser medium 43 is excited, and green light of a wavelength near 530 nm is generated. Multilayer films are formed on an incident portion 48 and an exit portion 49 of the ridged waveguide 46, and laser light is oscillated by the incident portion 48 and the exit portion 49. In other words, an optical resonator includes the laser medium 43, the incident portion 48, and the exit portion 49.

Examples of the material for the ridged waveguide 46 (the laser medium 43) are a Pr-doped YGA crystal, a Pr-doped YLF crystal, and a ceramic material. A grating 51 is formed near the exit portion 49 of the ridged waveguide 46.

The polarization switch 42 modulates the intensities of exit light 50 and the incident light 47 by adjusting the polarization direction of the incident light 47 from the GaN-based semiconductor laser 41.

In the short wavelength light source shown in FIG. 10, the polarization switch 42 and the ridged waveguide 46 are provided independently of each other. The invention is not limited to the above. The polarization switch 42 may be integrated into the ridged waveguide 46, which is advantageous in miniaturizing the short wavelength light source.

As described above, since light is waveguided without depending on the polarization direction by using the ridged waveguide 46, light having two wavelengths can be outputted from one light waveguide.

Third Embodiment

Figure 11:
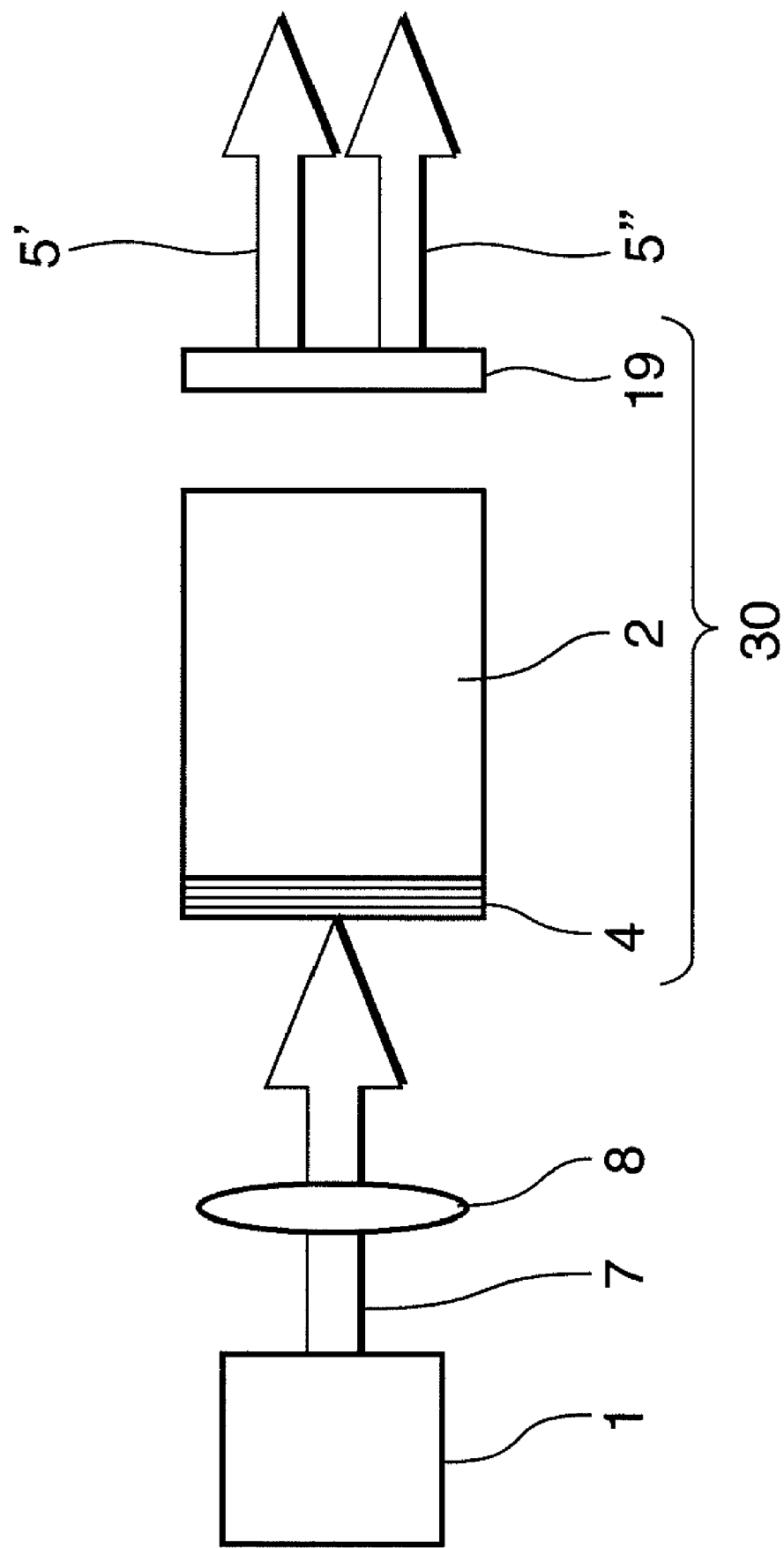
FIG. 11 is a diagram showing an arrangement of a short wavelength light source as a third embodiment of the invention.

In this section, a short wavelength light source as the third embodiment of the invention is described. FIG. 11 is a diagram showing an arrangement of the short wavelength light source as the third embodiment of the invention. In FIG. 11, like elements as in the short wavelength light source shown in FIG. 1 are indicated with like reference numerals, and description thereof is omitted herein. The short wavelength light source shown in FIG. 11 includes a GaN-based semiconductor laser 1, a multilayer film mirror 4, a light collecting optical system 8, a laser medium 2, and a polarization switch 19. An optical resonator 30 includes a laser medium 2, the multilayer film mirror 4, and the polarization switch 19.

In the short wavelength light source shown in FIG. 1, the polarization switch 6 is disposed between the light collecting optical system 8 and the multilayer film mirror 4. On the other hand, in the short wavelength light source shown in FIG. 11, the polarization switch 19 is disposed on the exit side of the laser medium 2, and has a function of switching over the polarization direction and a function of the multilayer film mirror 3. Specifically, the polarization switch 19 is disposed on the exit side of the laser medium 2, and constitutes the optical resonator with the laser medium 2 and the multilayer film mirror 4.

Figure 12:
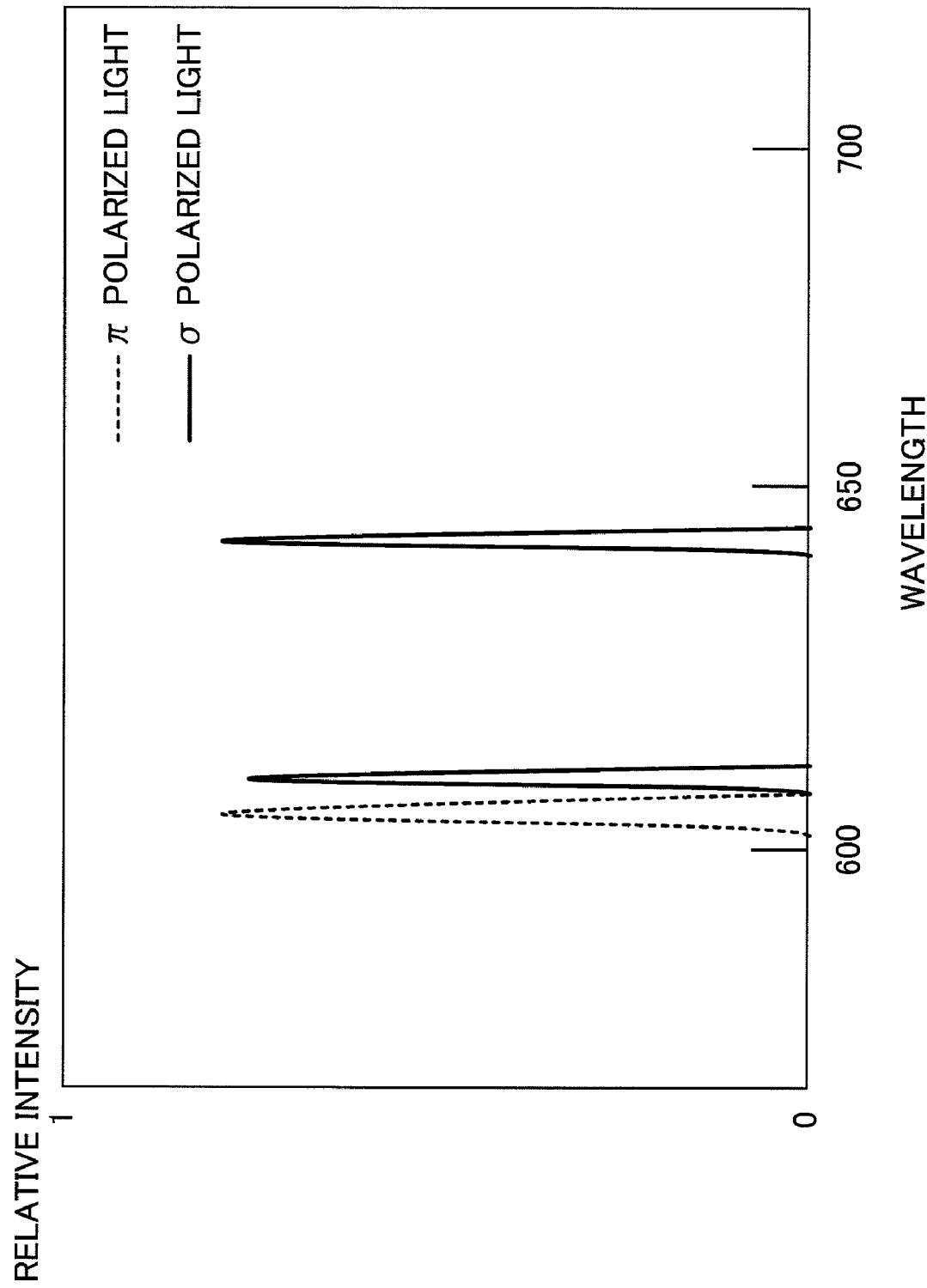
FIG. 12 is a diagram showing a fluorescence spectral profile of a Pr-doped YLF solid-state laser crystal.

The laser medium 2 is composed of a Pr-doped YLF solid-state laser crystal. FIG. 12 is a diagram showing fluorescence spectral profiles of a Pr-doped YLF solid-state laser crystal. Referring to FIG. 12, the axis of abscissas indicates a wavelength, and the axis of ordinate indicates a relative intensity. Further, the broken line in FIG. 12 indicates a fluorescence spectral profile in the case where light to be transmitted through the Pr-doped YLF solid-state laser crystal is π polarized light, and the solid line in FIG. 12 indicates a fluorescence spectral profile in the case where light to be transmitted through the Pr-doped YLF solid-state laser crystal is σ polarized light.

As shown in FIG. 12, the σ polarized light has a maximum relative intensity at a wavelength of 639 nm, and the π polarized light has a maximum relative intensity at a wavelength of 604 nm. The laser medium 2 oscillates laser light of different wavelengths depending on the polarization direction. The GaN-based semiconductor laser 1 emits pump light 7 as the σ polarized light. Since the laser medium 2 is configured to oscillate the σ polarized light in an initial state, the laser medium 2 oscillates light of a wavelength of 639 nm, and accordingly, laser light 5' of a wavelength of 639 nm is emitted from the optical resonator 30. Subsequently, the polarization switch 19 switches over the reflection light from the σ polarized light to the π polarized light by rotating the polarization direction by 90 degrees. As a result of the switching operation, the laser medium 2 oscillates the π polarized light i.e. oscillates light of a wavelength of 604 nm, and accordingly, the optical resonator 30 emits laser light 5" of a wavelength of 604 nm.

As described above, the laser medium 2 has different fluorescence spectral profiles between the π polarized light and the σ polarized light. Accordingly, the polarization switch 19 is so designed as to reflect the laser light 5" of a wavelength of 604 nm and the laser light 5' of a wavelength of 639 nm, and the wavelength of light to be emitted can be selected by switching over the polarization direction of reflection light by the polarization switch 19.

In the case where the short wavelength light source shown in FIG. 11 is incorporated in a color display device, it is possible to freely change the hue of a display image. For instance, red light having a wavelength of 604 nm has high luminosity. Accordingly, it is possible to set the light output of red light having a wavelength of 604 nm to about one-third of the light output of red light having a wavelength of 639 nm. Consequently, in emitting red light having a wavelength of 604 nm, the electric power for driving a red light source can be reduced to about one-third of a case of emitting red light of a wavelength of 639 nm. On the other hand, in the case where red light having a wavelength of 639 nm is emitted, the color reproducible range can be increased, thereby clearly displaying a red color. Thus, switching over between red light having a wavelength of 604 nm and red light having a wavelength of 639 nm enables to switch over between the energy saving mode and the color priority mode in a color display device.

As described above, the polarization switch 19 is disposed on the exit side of the laser medium 2, and the polarization switch 19 constitutes an optical resonator with the laser medium 2, and the multilayer film mirror 4 disposed on the incident side of the laser medium 2. The laser medium 2 oscillates laser light of different wavelengths depending on the polarization direction. Accordingly, light of different wavelengths can be emitted from the optical resonator.

Fourth Embodiment

In this section, described is a method of using a short wavelength light source. The short wavelength light sources in the first through the third embodiments are operable to emit plural visible light, and change the intensity ratio between the plural visible light. The short wavelength light sources, however, may involve a problem that the color purity is deteriorated due to intrusion of the pump light 7 into the emission light 5. For instance, in the case where light of a pure red color is intended to be outputted, blue pump light may be intruded, with the result that the color purity may be deteriorated. As a method for preventing deterioration of the color purity, as shown in FIG. 13, a short wavelength light source is provided with a wavelength separation mirror 24 on the output side of the light source.

Figure 13:
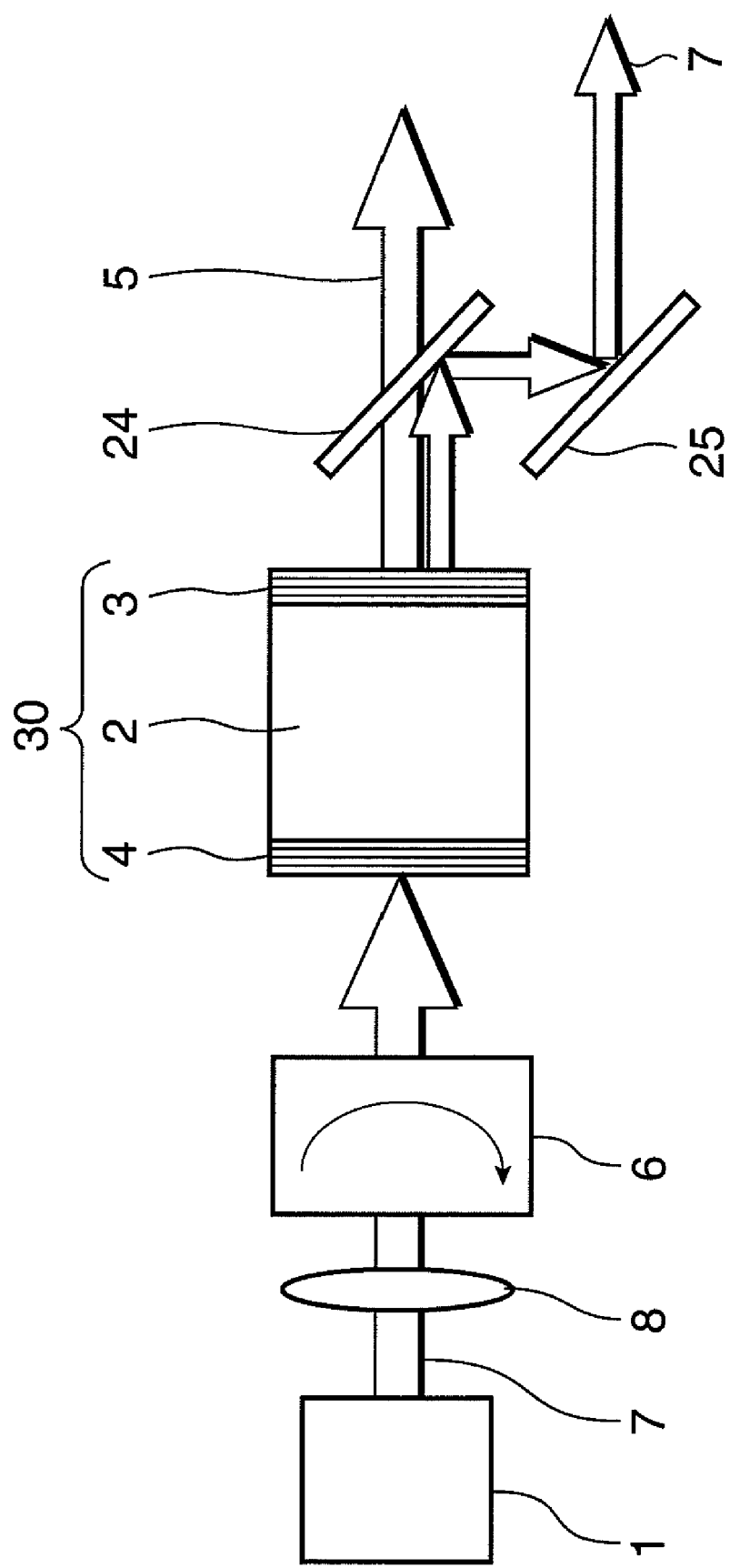
FIG. 13 is a diagram showing an arrangement of a short wavelength light source as a fourth embodiment of the invention.

FIG. 13 is a diagram showing an arrangement of a short wavelength light source as the fourth embodiment of the invention. In FIG. 13, like elements as in the short wavelength light source shown in FIG. 1 are indicated with like reference numerals, and description thereof is omitted herein. The short wavelength light source shown in FIG. 13 includes a GaN-based semiconductor laser 1, a laser medium 2, multilayer film mirrors 3 and 4, a polarization switch 6, a light collecting optical system 8, the wavelength separation mirror 24, and a reflection mirror 25.

The wavelength separation mirror 24 transmits one of pump light 7 emitted from the GaN-based semiconductor laser 1, and emission light 5 oscillated from the laser medium 2, and reflects the other of the pump light 7 and the emission light 5. The wavelength separation mirror 24 in the fourth embodiment reflects the pump light 7 and transmits the emission light 5. In the fourth embodiment, the wavelength separation mirror 24 corresponds to an example of a wavelength separation element.

The reflection mirror 25 reflects the pump light 7 or the emission light 5 reflected on the wavelength separation mirror 24 to align the directions of the respective light to be emitted. The reflection mirror 25 in the fourth embodiment reflects the pump light 7 reflected on the wavelength separation mirror 24.

As described above, since the pump light 7 and the emission light 5 are separated from each other by the wavelength separation mirror 24, a light source of a high color purity can be realized.

Further, as shown in FIG. 5, in the case where the multilayer film mirror 13 has a polarization characteristic, the pump light 7 and the emission light 5 are emitted in polarization directions different from each other. Accordingly, the respective light of two wavelengths can be separated even with use of a polarization separation mirror for separating light depending on the polarization direction.

Figure 14:
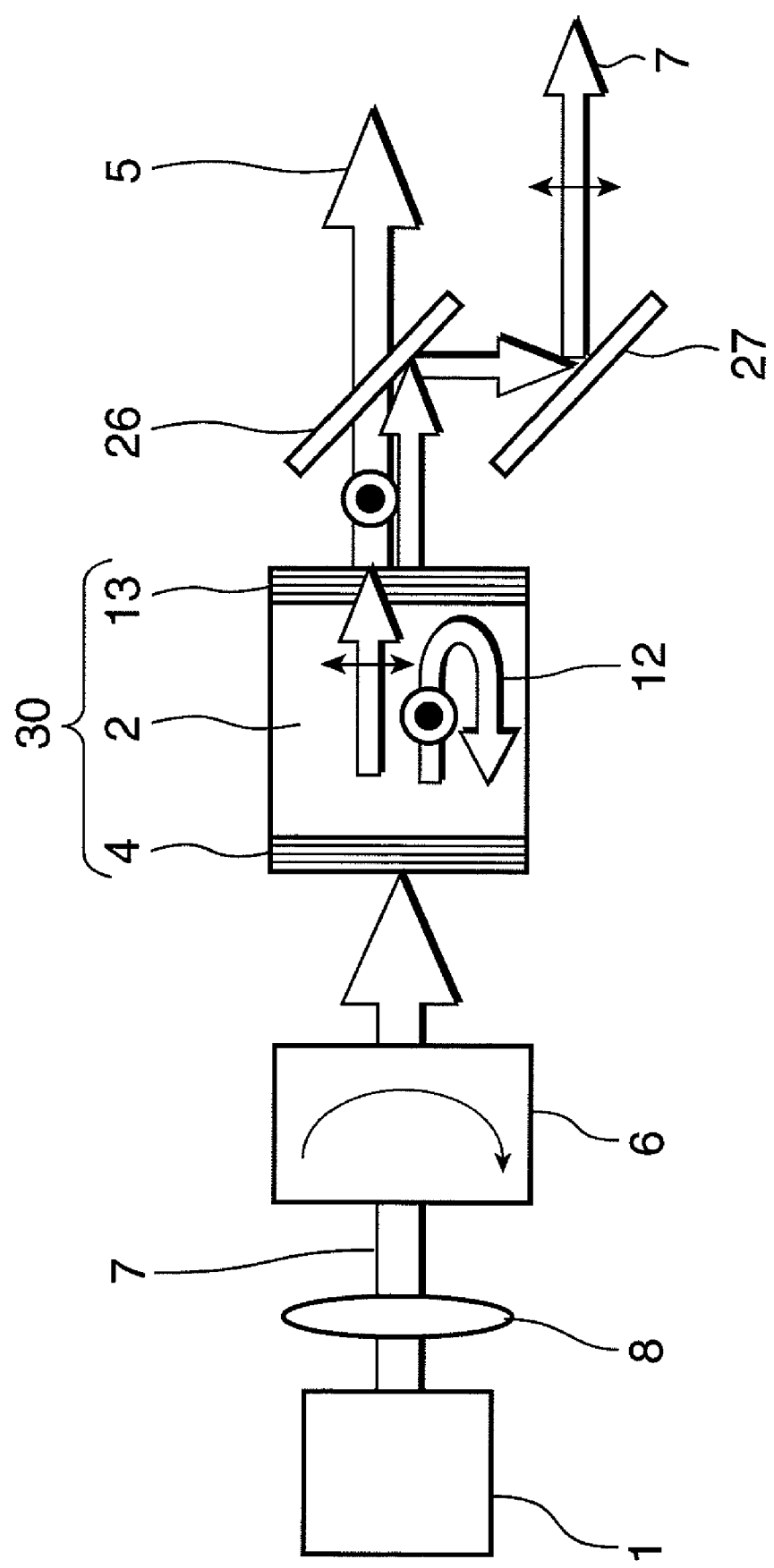
FIG. 14 is a diagram showing an arrangement of a short wavelength light source as a modification of the fourth embodiment of the invention.

FIG. 14 is a diagram showing an arrangement of a short wavelength light source as a modification of the fourth embodiment of the invention. In FIG. 14, like elements as in the short wavelength light source shown in FIG. 5 are indicated with like reference numerals, and description thereof is omitted herein. The short wavelength light source shown in FIG. 14 includes a GaN-based semiconductor laser 1, a laser medium 2, a multilayer film mirror 4, a polarization switch 6, a light collecting optical system 8, a multilayer film mirror 13, a polarization separation minor 26, and a reflection mirror 27.

The laser medium 2 absorbs pump light 7 i.e. π polarized light having a polarization direction in parallel to the C-axis of the laser medium 2, and transmits pump light 7 i.e. σ polarized light having a polarization direction perpendicular to the polarization direction of the π polarized light. The multilayer film minor 13 reflects the pump light 7 as the π polarized light, and transmits the pump light 7 as the σ polarized light, and emission light 5 as the π polarized light.

The polarization separation mirror 26 transmits one of the emission light 5 as the π polarized light, and the pump light 7 as the σ polarized light, and reflects the other of the emission light 5 and the pump light 7. The polarization separation minor 26 in the modification of the fourth embodiment reflects the pump light 7 and transmits the emission light 5. In the modification of the fourth embodiment, the polarization separation minor 26 corresponds to an example of a polarization separation element.

The reflection mirror 27 reflects the pump light 7 or the emission light 5 reflected on the polarization separation mirror 26 to align the directions of the respective light to be emitted. The reflection mirror 27 in the modification of the fourth embodiment reflects the pump light 7 reflected on the polarization separation mirror 26.

Further, in the case of the short wavelength light source as shown in FIG. 14, it is possible to substantially completely separate the pump light 7 and the emission light 5 having different wavelengths from each other by the polarization separation mirror 26. Accordingly, the above arrangement enables to continuously change the color of light to be emitted, and expand the variable range of the color by changing the polarization direction using the polarization switch 6.

In the case where a color display device is constructed by using an RGB light source, the arrangement of the short wavelength light source shown in FIG. 13 is different from the arrangement of the short wavelength light source shown in FIG. 14. The short wavelength light source shown in FIG. 13 is applied to a color display device shown in FIG. 15.

Figure 15:
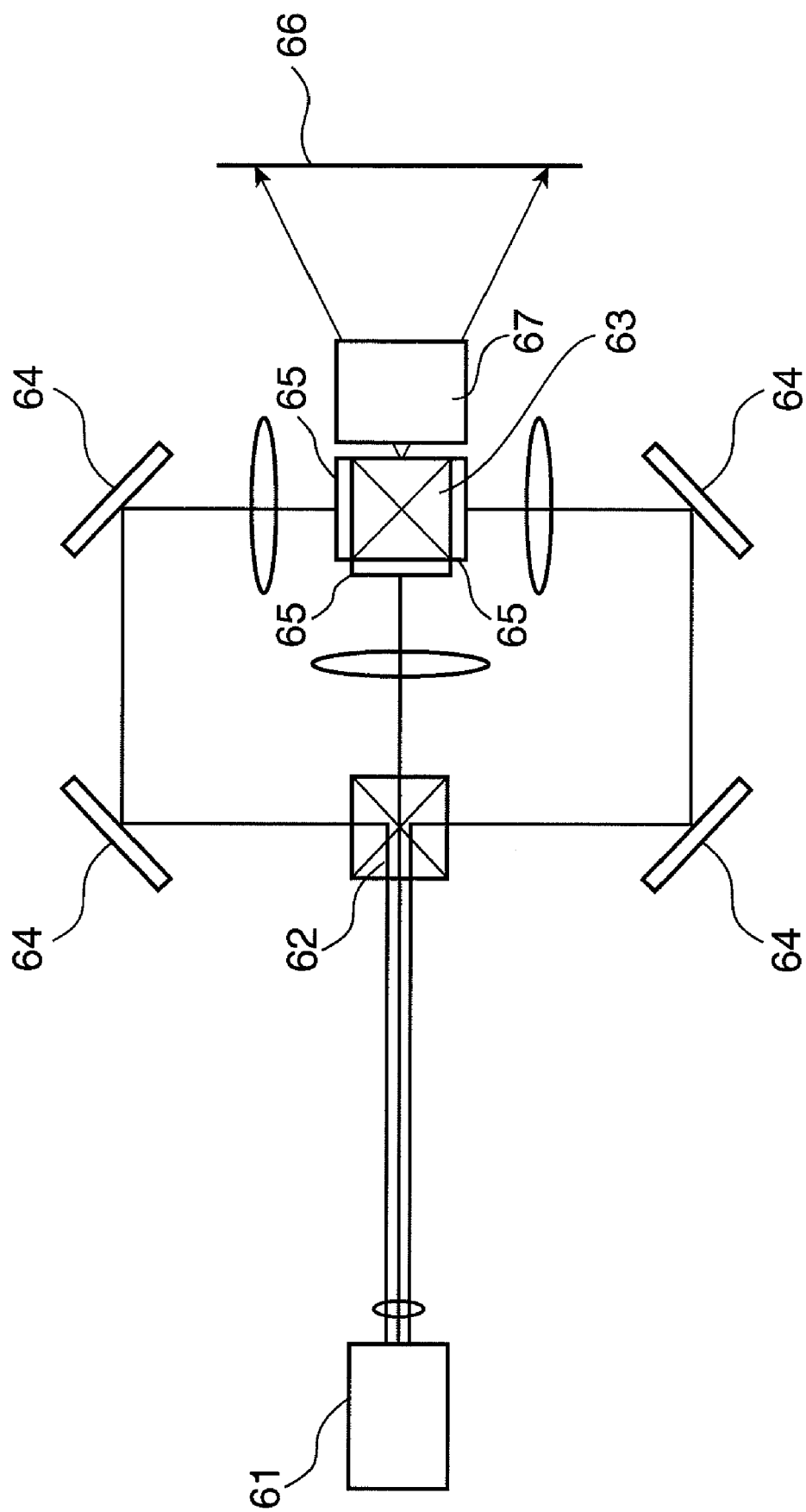
FIG. 15 is a diagram showing an arrangement of a color display device as the fourth embodiment of the invention.

FIG. 15 is a diagram showing an arrangement of a color display device in the fourth embodiment. The color display device shown in FIG. 15 includes a short wavelength light source 61, a wavelength separation prism 62, a multiplex prism 63, a reflection mirror 64, a liquid crystal panel 65, and a projection lens 67.

The short wavelength light source 61 is constituted of any one of the short wavelength light sources in the first through the fourth embodiments. Referring to FIG. 15, light emitted from the short wavelength light source 61 is separated into light of red, green, and blue by the wavelength separation prism 62. One of the separated three light is transmitted through the wavelength separation prism 62 and entered into the liquid crystal panel 65; and the remaining two of the separated three light are respectively reflected on the reflection mirror 64 and entered into the liquid crystal panel 65. The three light passing through the liquid crystal panel 65 are combined by the multiplex prism 63 into a light image, and the combined light image is projected onto a screen 66 through the projection lens 67. Since light of at least two colors is simultaneously emitted from the short wavelength light source 61, a color image is displayed by allowing the respective light of the colors to enter into the liquid crystal panel 65, and combining the images of simultaneously emitted light.

In the fourth embodiment, the color display device corresponds to an example of an optical device, and the wavelength separation prism 62, the multiplex prism 63, the reflection mirror 64, the liquid crystal panel 65, and the projection lens 67 correspond to an example of an optical system.

Further, by changing the color intensity ratio by the polarization switch in the short wavelength light source 61, the intensity ratio can be modulated depending on the color on a display screen. In the case of using an ordinary lamp, it is difficult to change the output intensity, and the intensity ratio between the respective light of red, green, and blue. On the other hand, in the arrangement of the fourth embodiment, since the output intensity of the short wavelength light source, and the intensity ratio between the respective light can be changed depending on an intended image to be displayed, the electric power consumption of the light source can be reduced.

In the case where a short wavelength light source for emitting blue light and red light is incorporated in the color display device in the fourth embodiment to display white light, the intensity ratio between red light and blue light is set to about 2:1. Considering the quantum efficiency, it is desirable to set the absorption rate of blue light with respect to a laser medium to about 75% in order to output red light and blue light at an intensity ratio of 2:1. If blue light of about 75% is absorbed and converted into red light, the output power ratio between red light and blue light becomes 2:1. The output intensity ratio between red light and blue light can be adjusted, based on the output power ratio.

As described above, the absorption rate of a laser medium differs depending on the wavelength, and the absorption amount of laser light is changed by switching over the polarization direction. Accordingly, the above arrangement enables to modulate the intensity ratio between blue laser light having a wavelength in the range of from 440 to 460 nm, and red laser light having a wavelength in the range of from 600 to 650 nm.

In the case where a short wavelength light source is used as a 2-wavelength light source, it is necessary to multiplex light of two colors, out of the light of the three primary colors from the short wavelength light source, and light of the color other than the two colors from another light source. In other words, in the case where blue light and red light are emitted from the short wavelength light source 61, it is necessary to provide the color display device with a light source for emitting green light, in addition to the short wavelength light source 61.

Figure 16:
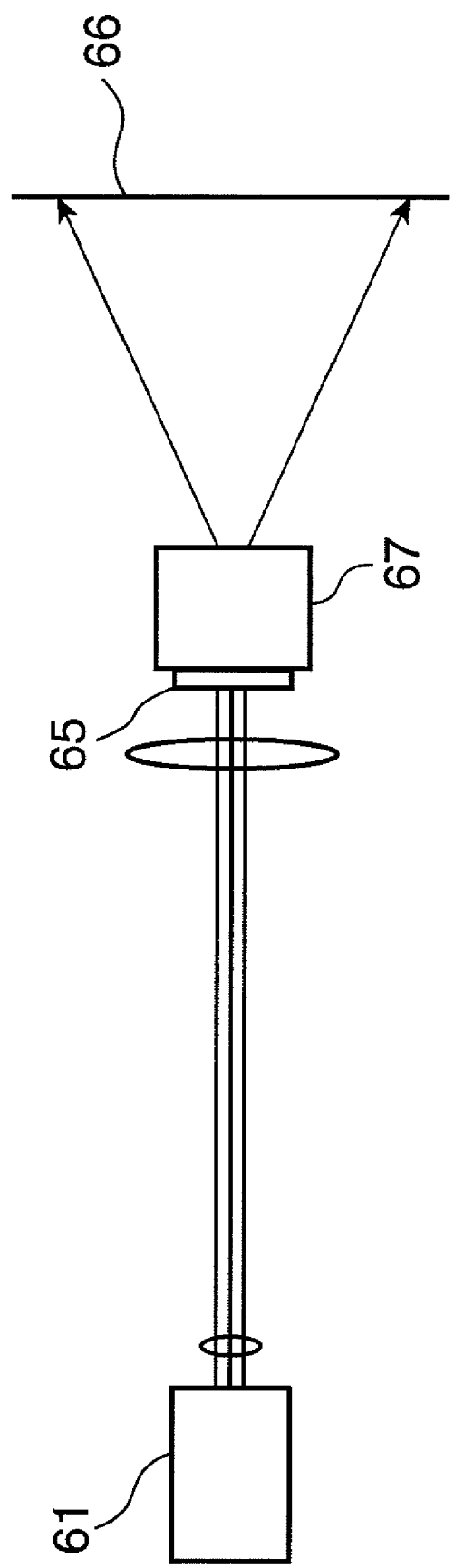
FIG. 16 is a diagram showing an arrangement of a color display device as a modification of the fourth embodiment of the invention.

The short wavelength light source shown in FIG. 14 is applied to a color display device shown in FIG. 16. In the color display device shown in FIG. 16, a single-panel liquid crystal panel is used to emit light of red, green, and blue with a time lag, and a color image is displayed by superimposing the light of these colors.

FIG. 16 is a diagram showing an arrangement of a color display device, as a modification of the fourth embodiment of the invention. In FIG. 16, like elements as in the color display device shown in FIG. 15 are indicated with like reference numerals, and description thereof is omitted herein. The color display device shown in FIG. 16 includes a short wavelength light source 61, a liquid crystal panel 65, and a projection lens 67.

In the modification of the fourth embodiment, the liquid crystal panel 65 and the projection lens 67 correspond to an example of an optical system.

Referring to FIG. 16, plural light emitted from the short wavelength light source 61 is transmitted through the liquid crystal panel 65, and thereafter, projected onto a screen 66 through the projection lens 67. A full-color image can be displayed by time-wise switching over between light of red, green, and blue; and an image, for projection. In this arrangement, it is possible to display a color image by time-wise switching over between light of two wavelengths by a polarization switch.

In the case where the short wavelength light source is used as a 2-wavelength light source, it is necessary to multiplex light of two colors, out of the light of the three primary colors from the short wavelength light source, and light of the color other than the two colors from another light source. In other words, in the case where blue light and red light are emitted from the short wavelength light source 61, it is necessary to provide the color display device with a light source for emitting green light, in addition to the short wavelength light source 61.

In the arrangement of this embodiment, there is no need of individually providing a blue light source by effectively using pump light, which is advantageous in reducing the cost. Further, since the short wavelength light source is a multi-wavelength light source, the optical arrangement can be simplified. Furthermore, the electric power consumption as a whole can be reduced by effectively using blue light as pump light.

As described above, at least two of red laser light, green laser light, and blue laser light are emitted from the short wavelength light source 61, and the red laser light, the green laser light, and the blue laser light are irradiated onto a screen or an irradiation object. Accordingly, the above arrangement enables to switch over between the plural laser light to be emitted from the short wavelength light source 61, and effectively use the plural laser light.

Fifth Embodiment

In the fourth embodiment, described is an arrangement for irradiating laser light onto the liquid crystal panel 65. The short wavelength light source in the fourth embodiment may be used as a planar light source for a liquid crystal backlight device by using substantially the same arrangement as the arrangement of the fourth embodiment. In the case where a short wavelength light is used as a planar light source, laser light is allowed to enter into a light guiding plate for waveguiding light to scatter the light on the surface of the light guiding plate. In the case where a light guiding plate is used, the light use efficiency of a liquid crystal panel can be enhanced by maintaining the polarization of laser light with respect to the light guiding plate.

Figure 17:
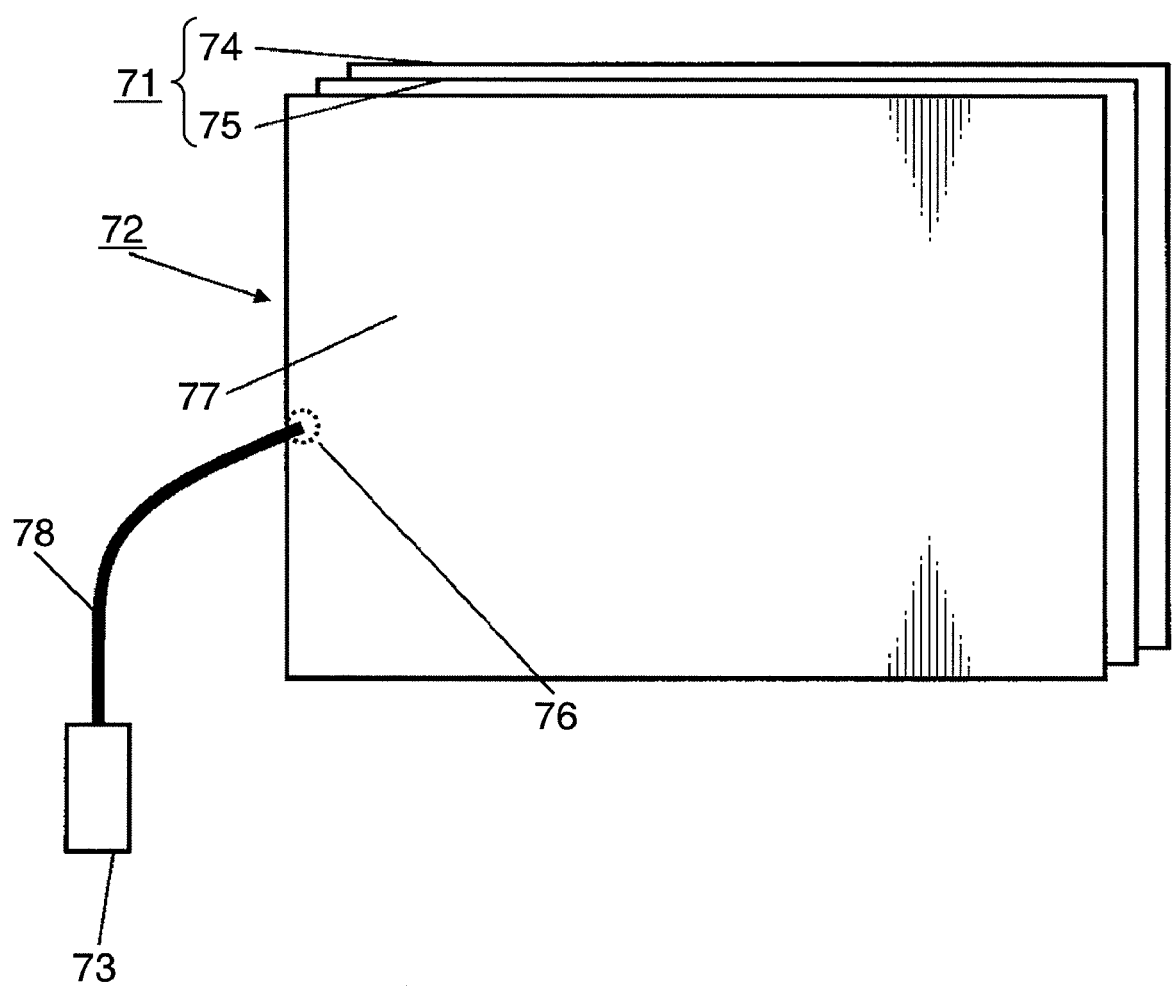
FIG. 17 is a diagram showing an arrangement of a color display device as a fifth embodiment of the invention.

FIG. 17 is a diagram showing an arrangement of a color display device in the fifth embodiment of the invention. The color display device shown in FIG. 17 is constituted of a liquid crystal panel 71, and a backlight illumination device 72 for illuminating the liquid crystal panel 71 from the backside thereof. The backlight illumination device 72 includes a short wavelength light source 73. The short wavelength light source 73 emits at least red light, green light, and blue light. The short wavelength light source 73 is constructed by using any one of the aforementioned short wavelength light sources in the first through the fourth embodiments.

The liquid crystal panel 71 is constituted of a polarization plate 74 and a liquid crystal plate 75 for displaying an image by using respective laser light of red, green, and blue to be emitted from the backlight illumination device 72. The backlight illumination device 72 in the fifth embodiment as shown in FIG. 17 is constituted of the short wavelength light source 73, an optical fiber 78 for collecting the laser light of red, green, and blue from the short wavelength light source 73 to guide the laser light to a light guiding plate 77 through a light guiding portion 76, and the light guiding plate 77 for emitting laser light from a primary plane (not shown) uniformly filled with the laser light of red, green, and blue, which has been guided from the light guiding portion 76.

Alternatively, the wavelength separation mirror 24 for separating light of different wavelengths as shown in FIG. 13, or the polarization separation mirror 26 for separating light in different polarization directions as shown in FIG. 14 may be disposed on an incident portion of the light guiding plate 77 or within the light guiding plate 77. The above arrangement enables to separate the light and guide the respective light to the liquid crystal panel 71, as necessary, to thereby enhance the light use efficiency.

In the case where a short wavelength light source is used as a 2-wavelength light source, it is necessary to multiplex light of two colors, out of the light of the three primary colors from the short wavelength light source, and light of the color other than the two colors from another light source. In other words, in the case where blue light and red light are emitted from the short wavelength light source 73, it is necessary to provide the color display device with a light source for emitting green light, in addition to the short wavelength light source 73.

As described above, at least two of the red laser light, the green laser light, and the blue laser light are emitted from the short wavelength light source 73, and the red laser light, the green laser light, and the blue laser light are separated from each other by the light guiding plate 77 depending on at least one of the wavelength and the polarization direction. Accordingly, the above arrangement enables to switch over between plural laser light to be emitted from the short wavelength light source 73, and effectively use the plural laser light.

Use of any one of the short wavelength light sources in the first through the fourth embodiments enables to change the output intensity, and the intensity ratio between the light of different wavelengths depending on an intended image to be displayed. Since it is possible to simultaneously emit light of two or more wavelengths from a single light source, the optical system can be simplified. Further, since pump light can be used, in the case where emission light is not necessary, the above arrangement enables to reduce the electric power consumption of the light source.

The aforementioned embodiments mainly include the inventions having the following features.

A short wavelength light source according to an aspect of the invention includes a laser light source which emits first laser light of a single polarization and having a first wavelength; an optical resonator including a solid-state laser medium which is excited by incidence of the first laser light and oscillates second laser light having a second wavelength different from the first wavelength; and a polarization switch which switches over at least one of polarization directions of the first laser light and the second laser light to thereby change the wavelength of laser light to be emitted from the optical resonator or an intensity ratio between a plurality of laser light to be emitted from the optical resonator.

In the above arrangement, the laser light source emits the first laser light of a single polarization and having the first wavelength, and the optical resonator includes the solid-state laser medium which is excited by incidence of the first laser light and oscillates the second laser light having the second wavelength different from the first wavelength. Further, the polarization switch switches over at least one of the polarization directions of the first laser light and the second laser light to thereby change the wavelength of laser light to be emitted from the optical resonator or the intensity ratio between a plurality of laser light to be emitted from the optical resonator.

Accordingly, the plurality of laser light to be emitted from the optical resonator can be switched over, and the plurality of laser light can be effectively used. Further, since the plurality of laser light of different wavelengths from each other can be simultaneously emitted from the single light source, the configuration of the optical system can be simplified.

In the short wavelength light source, preferably, the optical resonator may further include a pair of mirrors disposed at such positions as to sandwich the solid-state laser medium therebetween, and the polarization switch may be disposed between the laser light source, and a mirror on an incident side of the solid-state laser medium, out of the paired mirrors.

In the above arrangement, since the polarization switch is disposed between the laser light source, and the mirror on the incident side of the solid-state laser medium, out of the paired mirrors, the polarization direction of laser light can be changed before incidence of the laser light into the solid-state laser medium.

In the short wavelength light source, preferably, the paired mirrors may have a high reflectance characteristic with respect to the second laser light, and have a high transmittance characteristic with respect to the first laser light. This arrangement enables to resonate the second laser light within the optical resonator by the paired mirrors, and emit the first laser light as it is.

In the short wavelength light source, preferably, an absorption rate of the first laser light with respect to the solid-state laser medium may be set to about 75%. In this arrangement, since the absorption rate of the first laser light with respect to the soild-state laser medium is set to about 75%, in the case where the first laser light of about 75% is absorbed and converted into the second laser light, the intensity ratio between the second laser light and the first laser light can be set to about 2:1.

In the short wavelength light source, preferably, at least one of the paired mirrors may have a polarization dependency. In this arrangement, since at least one of the paired mirrors has a polarization dependency, it is possible to enhance the absorption efficiency of the first laser light with respect to the solid-state laser medium, and the transmittance efficiency of the first laser light with respect to the paired mirrors, and effectively use the plural laser light.

In the short wavelength light source, preferably, the first laser light and the second laser light may be visible light. In this arrangement, it is possible to emit the plural visible light while switching over between the plural visible light.

In the short wavelength light source, preferably, the polarization switch may include a wavelength plate attached to a rotary shaft extending in parallel to an optical axis of the first laser light, and a polarization axis of the wavelength plate may be perpendicular to the rotary shaft.

In the above arrangement, the polarization direction of the first laser light or the second laser light can be changed by rotating the wavelength plate attached to the rotary shaft extending in parallel to the optical axis of the first laser light to thereby emit the first laser light and the second laser light while switching over between the first laser light and the second laser light.

In the short wavelength light source, preferably, the solid-state laser medium may include a solid-state laser crystal having a birefringence, and the solid-state laser crystal may be doped with at least one selected from the group consisting of $Pr^{3+}$, $Eu^{3+}$, $Sm^{3+}$, $Ce^{3+}$, $Tm^{3+}$, $Tb^{3+}$, and $Eu^{2+}$.

In the above arrangement, since the solid-state laser crystal doped with at least one selected from the group consisting of $Pr^{3+}$, $Eu^{3+}$, $Sm^{3+}$, $Ce^{3+}$, $Tm^{3+}$, $Tb^{3+}$, and $Eu^{2+}$ is used, it is possible to generate laser light of an intended wavelength in the solid-state laser crystal.

In the short wavelength light source, preferably, the solid-state laser medium may include a double clad fiber, and a core portion of the double clad fiber may include a solid-state laser crystal doped with at least one selected from the group consisting of $Pr^{3+}$, $Eu^{3+}$, $Sm^{3+}$, $Ce^{3+}$, $Tm^{3+}$, $Tb^{3+}$, and $Eu^{2+}$.

In the above arrangement, since there is used the double clad fiber including the solid-state laser crystal doped with at least one selected from the group consisting of $Pr^{3+}$, $Eu^{3+}$, $Sm^{3+}$, $Ce^{3+}$, $Tm^{3+}$, $Tb^{3+}$, and $Eu^{2+}$ as core portions, it is possible to generate laser light of an intended wavelength in the double clad fiber.

In the short wavelength light source, preferably, the solid-state laser crystal may be co-doped with Ho. In this arrangement, co-doping Ho enables to increase the absorption coefficient of the solid-state laser medium and enhance the excitation efficiency to thereby effectively use the plural laser light.

Preferably, the short wavelength light source may further include a wavelength conversion element which converts the first laser light or the second laser light into a harmonic.

In the above arrangement, since the first laser light or the second laser light is converted into a harmonic by the wavelength conversion element, it is possible to emit the first laser light which has been converted into a harmonic, and the second laser light which has been converted into a harmonic, while switching over between the first laser light and the second laser light.

Preferably, the short wavelength light source may further include a reflecting member which is disposed on a light exit side of the optical resonator, and reflects the first laser light. In this arrangement, the oscillation wavelength of the laser light source can be locked by the reflecting member which is disposed on the light exit side of the optical resonator, and reflects the first laser light.

In the short wavelength light source, preferably, the solid-state laser medium may include an $LiYF_4$ crystal or an $LiLuF_4$ crystal doped with a Pr ion. In this arrangement, since the absorption efficiency of the $LiYF_4$ crystal or the $LiLuF_4$ crystal doped with a Pr ion is increased, in the case where the crystal is excited by π polarized light having a polarization direction in parallel to the C-axis of the solid-state laser crystal, the excitation efficiency can be controlled depending on the polarization direction of excitation light.

In the short wavelength light source, preferably, the first wavelength may be in a range of from 440 to 460 nm, the second wavelength may be in a range of from 600 to 650 nm, an absorption rate of the solid-state laser medium may differ depending on the wavelength, and the polarization switch may modulate an intensity ratio between the first laser light, and the second laser light to be outputted from the optical resonator.

In the above arrangement, since the absorption rate of the solid-state laser medium differs depending on the wavelength, and the absorption amount of laser light is changed by switching over between the polarization directions, it is possible to modulate the intensity ratio between blue laser light having the first wavelength in the range of from 440 to 460 nm, and red laser light having the second wavelength in the range of from 600 to 650 nm.

In the short wavelength light source, preferably, the first wavelength may be in a range of from 440 to 460 nm, and the second wavelength may be in a range of from 515 to 555 nm. In this arrangement, it is possible to switch over between blue laser light having the first wavelength in the range of from 440 to 460 nm, and green laser light having the second wavelength in the range of from 515 to 555 nm.

In the short wavelength light source, preferably, the solid-state laser medium may absorb the first laser light in a first polarization direction, and transmit the first laser light in a second polarization direction perpendicular to the first polarization direction, an exit-side mirror out of the paired mirrors may reflect the first laser light in the first polarization direction, and transmit the first laser light in the second polarization direction and the second laser light in the first polarization direction, and the short wavelength light source may further include the polarization separation element which transmits one of the second laser light in the first polarization direction and the first laser light in the second polarization direction, and reflects the other of the second laser light and the first laser light.

In the above arrangement, the solid-state laser medium absorbs the first laser light in the first polarization direction, and transmits the first laser light in the second polarization direction perpendicular to the first polarization direction. The exit-side mirror out of the paired mirrors reflects the first laser light in the first polarization direction, and transmits the first laser light in the second polarization direction and the second laser light in the first polarization direction. The polarization separation element transmits one of the second laser light in the first polarization direction and the first laser light in the second polarization direction, and reflects the other of the second laser light and the first laser light. Accordingly, it is possible to emit the first laser light and the second laser light, while separating the first laser light and the second laser light from each other depending on the polarization direction.

Preferably, the short wavelength light source may further include a wavelength separation element which transmits one of the first laser light and the second laser light, and reflects the other of the first laser light and the second laser light.

In the above arrangement, the wavelength separation element transmits one of the first laser light and the second laser light, and reflects the other of the first laser light and the second laser light. Accordingly, it is possible to emit the first laser light and the second laser light, while separating the first laser light and the second laser light from each other depending on the wavelength.

In the short wavelength light source, preferably, the solid-state laser medium may include a plurality of solid-state laser media having compositions different from each other. In this arrangement, it is possible to emit laser light of plural wavelengths by the solid-state laser media having the compositions different from each other, and enhance the color reproducible range.

In the short wavelength light source, preferably, the optical resonator may further include a mirror disposed on an incident side of the solid-state laser medium, and the polarization switch may be disposed on an exit side of the solid-state laser medium, and constitute the optical resonator with the solid-state laser medium and the mirror.

In the above arrangement, the polarization switch is disposed on the exit side of the solid-state laser medium, and constitutes the optical resonator with the solid-state laser medium, and the mirror disposed on the incident side of the solid-state laser medium. Accordingly, it is possible to emit light of different wavelengths from the optical resonator.

An optical device according to another aspect of the invention includes the short wavelength light source having any one of the above arrangements, and an optical system which irradiates the laser light emitted from the short wavelength light source onto a screen or an irradiation object, wherein the short wavelength light source emits at least two laser light out of red laser light, green laser light, and blue laser light, and switches over between the two laser light by the polarization switch to thereby change a color to be displayed.

In the above arrangement, the short wavelength light source is allowed to emit at least two laser light out of the red laser light, the green laser light, and the blue laser light, and the red laser light, the green laser light, and the blue laser light are irradiated onto the screen or the irradiation object. Accordingly, it is possible to switch over between plural laser light to be emitted from the short wavelength light source, and effectively use the plural laser light.

An optical device according to another aspect of the invention includes the short wavelength light source having any one of the above arrangements, and a light guiding plate which has a polarization characteristic of waveguiding the laser light emitted from the short wavelength light source, wherein the short wavelength light source emits at least two laser light out of red laser light, green laser light, and blue laser light, and the light guiding plate separates the red laser light, the green laser light, and the blue laser light from each other depending on at least one of the wavelength and the polarization direction.

In the above arrangement, the short wavelength light source is allowed to emit at least two laser light out of the red laser light, the green laser light, and the blue laser light, and the red laser light, the green laser light, and the blue laser light are separated from each other by the light guiding plate depending on at least one of the wavelength and the polarization direction. Accordingly, it is possible to switch over between plural light to be emitted from the short wavelength light source, and effectively use the plural light.

INDUSTRIAL APPLICABILITY

The inventive short wavelength light source and the inventive optical device can effectively use a plurality of laser light, and are useful as a short wavelength light source using a solid-state laser medium, and an optical device incorporated with the short wavelength light source.

The invention claimed is:

1. A short wavelength light source comprising:
   a laser light source which emits first laser light of a single polarization and having a first wavelength;
   an optical resonator including a solid-state laser medium which is excited by incidence of the first laser light and emits second laser light having a second wavelength different from the first wavelength; and
   a polarization switch which switches over at least one of polarization directions of the first laser light and the second laser light to thereby change the wavelength of laser light to be emitted from the optical resonator.

2. The short wavelength light source according to claim 1, wherein
   the optical resonator further includes a pair of mirrors disposed at such positions as to sandwich the solid-state laser medium therebetween, and
   the polarization switch is disposed between the laser light source, and a mirror on an incident side of the solid-state laser medium, out of the paired mirrors.

3. The short wavelength light source according to claim 2, wherein
the paired mirrors have a high reflectance characteristic with respect to the second laser light, and have a high transmittance characteristic with respect to the first laser light.

4. The short wavelength light source according to claim 1, wherein
an absorption rate of the first laser light with respect to the solid-state laser medium is set to about 75%.

5. The short wavelength light source according to claim 2, wherein at least one of the paired mirrors has a polarization dependency.

6. The short wavelength light source according to claim 1, wherein the first laser light and the second laser light are visible light.

7. The short wavelength light source according to claim 1, wherein
the polarization switch includes a wavelength plate attached to a rotary shaft extending in parallel to an optical axis of the first laser light, and
a polarization axis of the wavelength plate is perpendicular to the rotary shaft.

8. The short wavelength light source according to claim 1, wherein
the solid-state laser medium includes a solid-state laser crystal having a birefringence, and
the solid-state laser crystal is doped with at least one selected from the group consisting of $Pr^{3+}$, $Eu^{3+}$, $Sm^{3+}$, $Ce^{3+}$, $Tm^{3+}$, $Tb^{3+}$, and $Eu^{2+}$.

9. The short wavelength light source according to claim 1, wherein
the solid-state laser medium includes a double clad fiber, and
a core portion of the double clad fiber includes a solid-state laser crystal doped with at least one selected from the group consisting of $Pr^{3+}$, $Eu^{3+}$, $Sm^{3+}$, $Ce^{3+}$, $Tm^{3+}$, $Tb^{3+}$, and $Eu^{2+}$.

10. The short wavelength light source according to claim 8, wherein the solid-state laser crystal is co-doped with Ho.

11. The short wavelength light source according to claim 1, further comprising
a wavelength conversion element which converts the first laser light or the second laser light into a harmonic.

12. The short wavelength light source according to claim 1, further comprising
a reflecting member which is disposed on a light exit side of the optical resonator, and reflects the first laser light.

13. The short wavelength light source according to claim 1, wherein the solid-state laser medium includes an $LiYF_4$ crystal or an $LiLuF_4$ crystal doped with a Pr ion.

14. The short wavelength light source according to claim 1, wherein
the first wavelength is in a range of from 440 to 460 nm,
the second wavelength is in a range of from 600 to 650 nm,
an absorption rate of the solid-state laser medium differs depending on the wavelength, and
the polarization switch modulates an intensity ratio between the first laser light, and the second laser light to be outputted from the optical resonator.

15. The short wavelength light source according to claim 1, wherein
the first wavelength is in a range of from 440 to 460 nm, and the second wavelength is in a range of from 515 to 555 nm.

16. The short wavelength light source according to claim 1, wherein
the solid-state laser medium absorbs the first laser light in a first polarization direction, and transmits the first laser light in a second polarization direction perpendicular to the first polarization direction,
an exit-side mirror out of the paired mirrors reflects the first laser light in the first polarization direction, and transmits the first laser light in the second polarization direction and the second laser light in the first polarization direction, and
the short wavelength light source further comprises a polarization separation element which transmits one of the second laser light in the first polarization direction and the first laser light in the second polarization direction, and reflects the other of the second laser light and the first laser light.

17. The short wavelength light source according to claim 1, further comprising
a wavelength separation element which transmits one of the first laser light and the second laser light, and reflects the other of the first laser light and the second laser light.

18. The short wavelength light source according to claim 1, wherein
the solid-state laser medium includes a plurality of solid-state laser media having compositions different from each other.

19. The short wavelength light source according to claim 1, wherein
the optical resonator further includes a mirror disposed on an incident side of the solid-state laser medium, and
the polarization switch is disposed on an exit side of the solid-state laser medium, and constitutes the optical resonator with the solid-state laser medium and the mirror.

20. An optical device comprising:
the short wavelength light source of claim 1; and
an optical system which irradiates the laser light emitted from the short wavelength light source onto a screen or an irradiation object, wherein
the short wavelength light source emits at least two laser light out of red laser light, green laser light, and blue laser light, and switches over between the two laser light by the polarization switch to thereby change a color to be displayed.

21. An optical device comprising:
the short wavelength light source of claim 1; and
a light guiding plate which has a polarization characteristic of waveguiding the laser light emitted from the short wavelength light source, wherein
the short wavelength light source emits at least two laser light out of red laser light, green laser light, and blue laser light, and
the light guiding plate separates the red laser light, the green laser light, and the blue laser light from each other depending on at least one of the wavelength and the polarization direction.

* * * * *